US012173535B2

(12) United States Patent
Reger

(10) Patent No.: US 12,173,535 B2
(45) **Date of Patent: *Dec. 24, 2024**

(54) DOOR SECURITY DEVICE

(71) Applicant: NOTROX LLC, Houston, TX (US)

(72) Inventor: John Reger, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,385

(22) Filed: Feb. 27, 2023

(65) Prior Publication Data

US 2023/0392423 A1 Dec. 7, 2023

Related U.S. Application Data

(63) Continuation of application No. 17/881,025, filed on Aug. 4, 2022, now Pat. No. 11,619,083, which is a continuation of application No. 17/532,418, filed on Nov. 22, 2021, now Pat. No. 11,447,993.

(51) Int. Cl.

| | |
|---|---|
| ***E05D 11/06*** | (2006.01) |
| ***E05D 3/02*** | (2006.01) |
| ***E05D 5/02*** | (2006.01) |
| ***E05D 11/00*** | (2006.01) |
| ***E05D 11/10*** | (2006.01) |

(52) U.S. Cl.

CPC ............ *E05D 11/0027* (2013.01); *E05D 3/02* (2013.01); *E05D 5/02* (2013.01); *E05D 11/1014* (2013.01); *E05D 2011/0045* (2013.01)

(58) Field of Classification Search

None

See application file for complete search history.

(56) References Cited

U.S. PATENT DOCUMENTS

| | | | | |
|---|---|---|---|---|
| 2,794,665 A * | 6/1957 | Sasse | E05C 19/18 16/351 |
| 3,431,591 A * | 3/1969 | Betso | E05D 7/105 16/265 |
| 3,810,667 A * | 5/1974 | Dugan | E05C 3/048 292/297 |
| 6,353,967 B1 * | 3/2002 | Escobar | E05D 11/06 16/374 |
| 8,534,721 B1 * | 9/2013 | Boggs | E05C 3/008 292/296 |
| 2005/0046201 A1 * | 3/2005 | Patire | E05C 19/182 292/289 |

(Continued)

FOREIGN PATENT DOCUMENTS

| | | | |
|---|---|---|---|
| GB | 2063990 A * | 6/1981 | E05C 3/048 |
| GB | 2098271 A * | 11/1982 | E05C 3/048 |

*Primary Examiner* — Chuck Y Mah

(57) ABSTRACT

A door security device for an in-swing door includes a mounting plate secured to the door jamb adjacent the door outside edge, a hinge pin assembly supported by the mounting plate proximate the door outside edge, a locking swing plate secured to the hinge pin assembly for pivotal movement between unlocked and locked angular positions in relation to the hinge pin vertical axis, the locking swing plate biased by force of gravity to a lowermost position, and the mounting plate having a first receiver wall defining the lowermost position of the locking swing plate in the locked position perpendicular to a first rear surface of the mounting plate and defining the uppermost position of the locking swing plate in the unlocked position away from the locked angular position.

17 Claims, 28 Drawing Sheets

(56) References Cited

U.S. PATENT DOCUMENTS

| | | | | |
|---|---|---|---|---|
| 2009/0217485 | A1* | 9/2009 | Springer | E05D 7/009 16/297 |
| 2010/0251520 | A1* | 10/2010 | Corso | E05D 5/12 16/342 |
| 2011/0156409 | A1* | 6/2011 | Alvarenga | E05C 19/184 292/175 |
| 2016/0298361 | A1* | 10/2016 | Dieguez | E05B 15/0205 |
| 2018/0128025 | A1* | 5/2018 | Estrada | E05C 17/56 |
| 2022/0056742 | A1* | 2/2022 | Kim | E05D 11/1014 |

* cited by examiner

DOOR SECURITY DEVICE

CROSS-REFERENCE TO RELATED APPLICATIONS

This application claims priority under 35 U.S.C. § 119 to U.S. Non-provisional patent application Ser. No. 17/881,025 entitled "DOOR SECURITY DEVICE" filed in the name of Notrox LLC on Aug. 4, 2022, the entirety of which is incorporated by reference. This application claims priority under 35 U.S.C. § 119 to U.S. Non-provisional patent Ser. No. 11/447,993, application Ser. No. 17/532,418 entitled "DOOR SECURITY DEVICE" filed in the name of Notrox LLC on Nov. 22, 2021, the entirety of which is incorporated by reference. This application is related to U.S. non-provisional application Ser. No. 17/520,309 filed Nov. 5, 2021 and titled "Door Security Device," which is hereby incorporated by reference in entirety.

FIELD OF THE INVENTION

The present disclosure relates to door mechanical security devices.

BACKGROUND OF THE INVENTION

Many buildings such as offices, residences and hotels include one-way, in-swing doors. The in-swing operation of doors may comply with building codes and best practices for weatherization, heating and cooling.

When security of the interior space or occupants is a concern, in-swing doors are normally locked. Nonetheless, doors mounted for in-swing operation are targets for forced entry. For example, an in-swing door may be targeted for forced entry with a pry bar or lock picks when located in a dark, remote area, where a burglar is unlikely to be discovered. Where a building is likely to be occupied, or targeted because it is known to be occupied, the risks and danger of violent forced entry attacks are particularly high. Violent forced entry attacks are more likely where the occupant is thought to be alone, unarmed, and defenseless against physical attack by a powerful or armed intruder. Although males are regularly victimized, females when alone, children, handicapped persons, and elderly persons are particularly susceptible to forced entry assaults, such as armed robberies and other violent crimes. In part, this is because doors mounted to open in the in-swing direction, when cracked open by the occupant to peek outside, with or without a sliding chain lock in place, often are readily forced open by brute force attack of an intruder using the element of surprise and greater strength or size, or leverage of a pry bar, to violently slam the door back into the face of the unsuspecting occupant answering the door.

The risks of substantial losses due to burglary, and violent attacks by forced entry against a single occupant, make it desirable to install both an ordinary electronic security monitoring system in the building and supplemental mechanical security devices for the in-swing doors. Supplemental mechanical security devices may be attached to the door, door frame, or both. One of the most effective mechanical security devices for an in-swing door of an occupied space is a large bar or rod leaning at an acute angle between the interior doorknob and a catch or receiver in the floor. Security rods, however, are large and cumbersome, which often deters people from their use. Dead bolts are effective when bolted, but forced entry attacks against occupants are typically perpetuated when the occupant answering the door has been induced to unlock the dead bolt and then is surprised by the attacker. In view of the preceding considerations, need exists for improved door security devices for in-swing doors.

BRIEF SUMMARY OF THE INVENTION

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure provides an improved door locking device for securing an in-swing door against forced entry. A door security device for an in-swing door may include a mounting plate to be secured to the door jamb adjacent the door outside edge to support a hinge pin assembly outside the door swing path. A locking swing plate is secured to the hinge pin assembly for pivotal movement between unlocked and locked angular positions in relation to the hinge pin vertical axis, and between uppermost and lowermost positions along the hinge pin vertical axis in relation to the mounting plate. In the locking angular position, the locking swing plate is biased by force of gravity to a lowermost position and is located to abut the door interior surface and thus secure the door in the door closed position. The mounting plate may have a first receiver wall having varying wall height and supporting the locking swing plate in uppermost position, locking position, or a plurality of intermediate positions.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Figure 1:
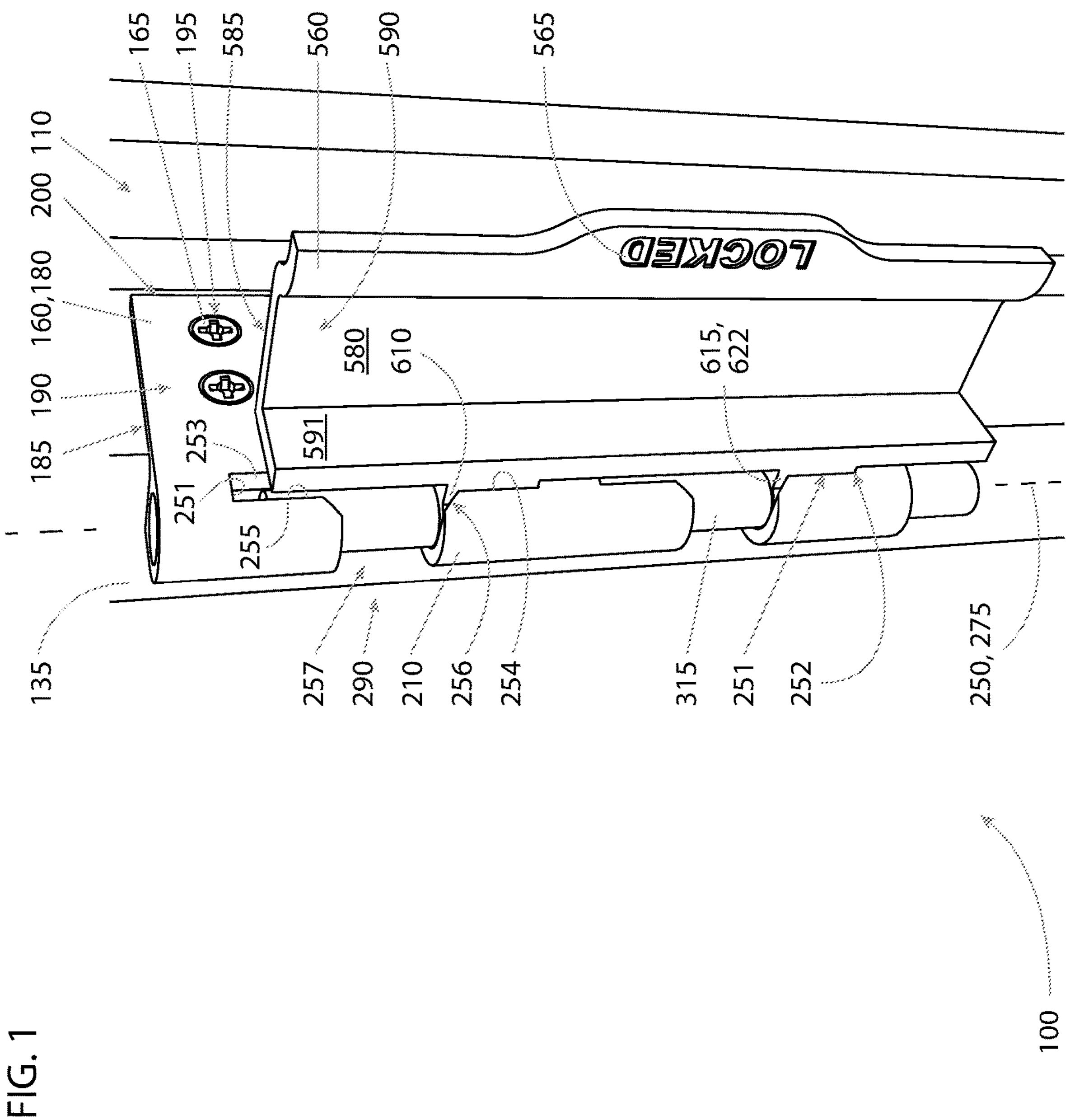
FIG. 1 is a partial perspective view showing a door locking device in use with an in-swing door in open position, with the locking swing plate in locking angular position perpendicular to the mounting plate and in unlocked uppermost position in relation to the mounting plate.
Figure 2:
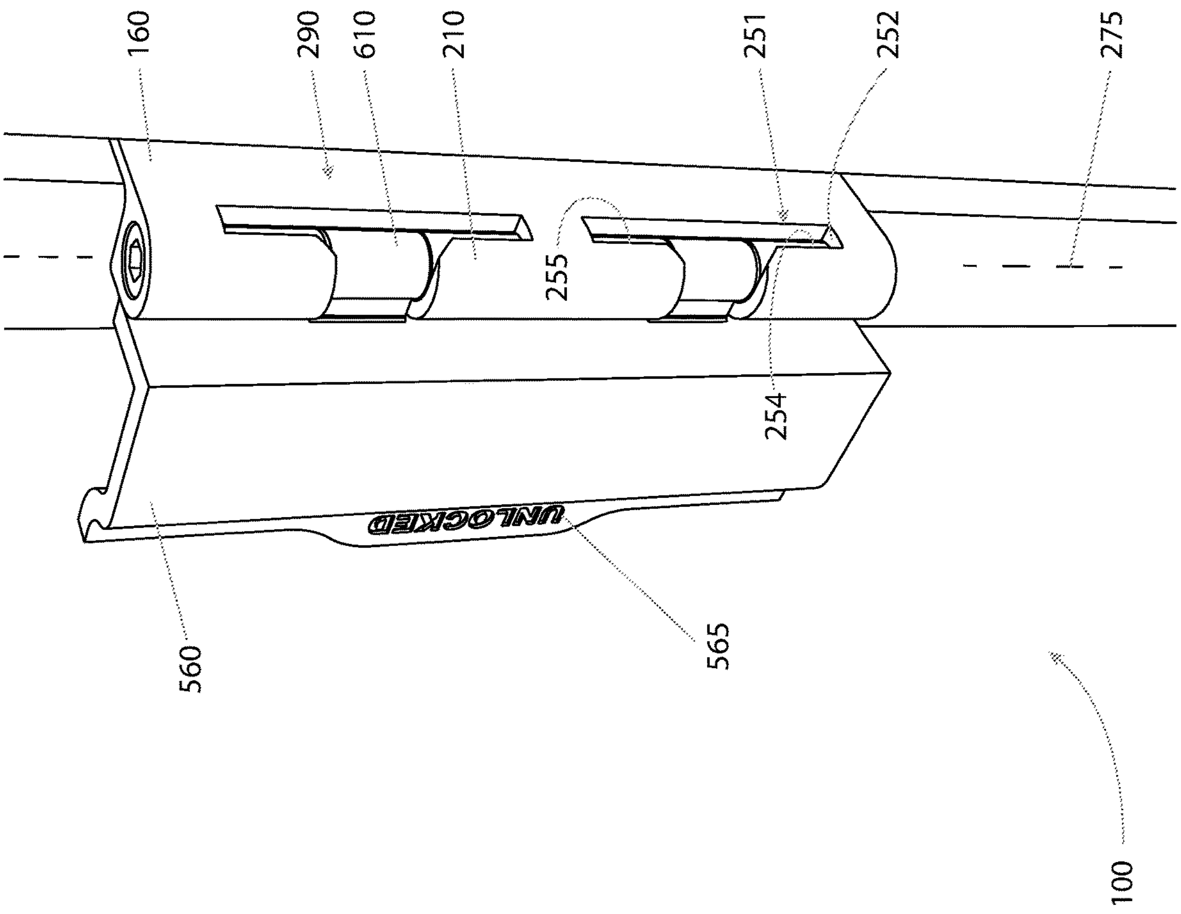
FIG. 2 is a partial perspective view of the door locking device shown in FIG. 1, in unlocked position, in use with an in-swing door in closed position.

In this detailed description, reference is made to the accompanying drawings which form a part hereof, and in which is shown by way of illustration specific embodiments which may be practiced. Reference now should be made to the drawings, in which the same reference numbers are used throughout the different figures to designate the same components. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms “a”, “an”, and “the” are intended to include the plural forms as well, unless the context clearly indicates otherwise. It will be further understood that the terms “comprises” and/or “comprising” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Illustrated in FIG. 1 is a partial perspective view showing a door locking device 100 in locked position, in use with an in-swing door 105 (or "door" 105 being shown in "open" position in FIG. 1) in an exemplary embodiment. As used herein, "open" position shall include fully open position and any position other than fully "closed" position wherein the door 105 abuts door frame 110 such that door handle 140 when operated can cause the latching mechanism to latch the door 105 in fixed relation to door frame 110.

Door locking device 100 is adapted for securing the in-swing door 105 against forced entry. To aid in ready understanding of the scope and utility of the disclosed subject matter, the in-swing door 105 will be further described. The reference "Parts of a Door Explained" by Diffey, N. (Salisbury Joinery blog dated Nov. 7, 2017) viewed Nov. 2, 2021 at https://www.salisburyjoinery.com/blog/parts-of-a-door-explained, is incorporated by reference in entirety.

Figure 26:
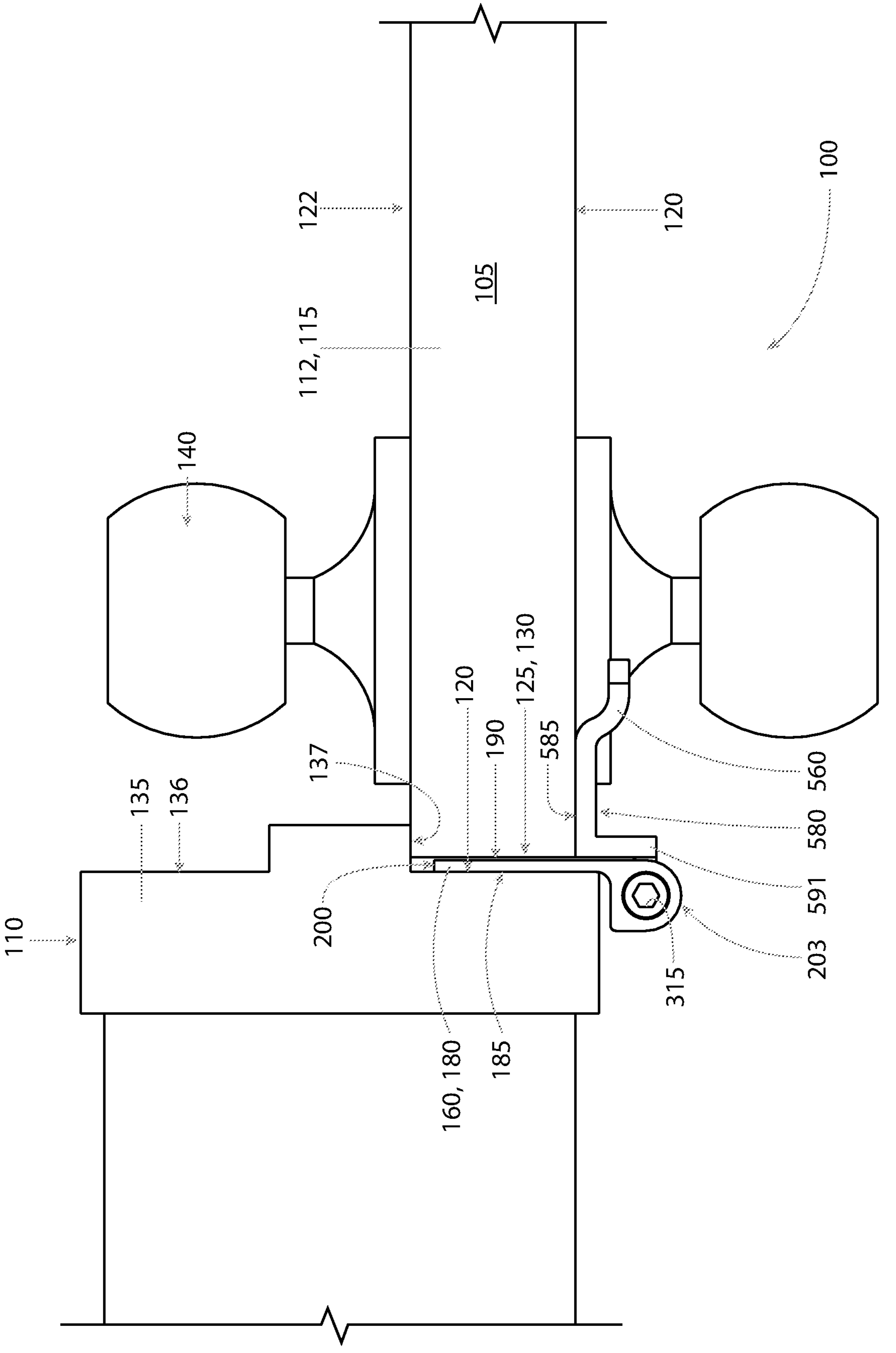
FIG. 26 is an enlarged partial top cross-section view showing the door locking device in locking angular position in relation to the mounting plate and door in the closed position.
Figure 27:
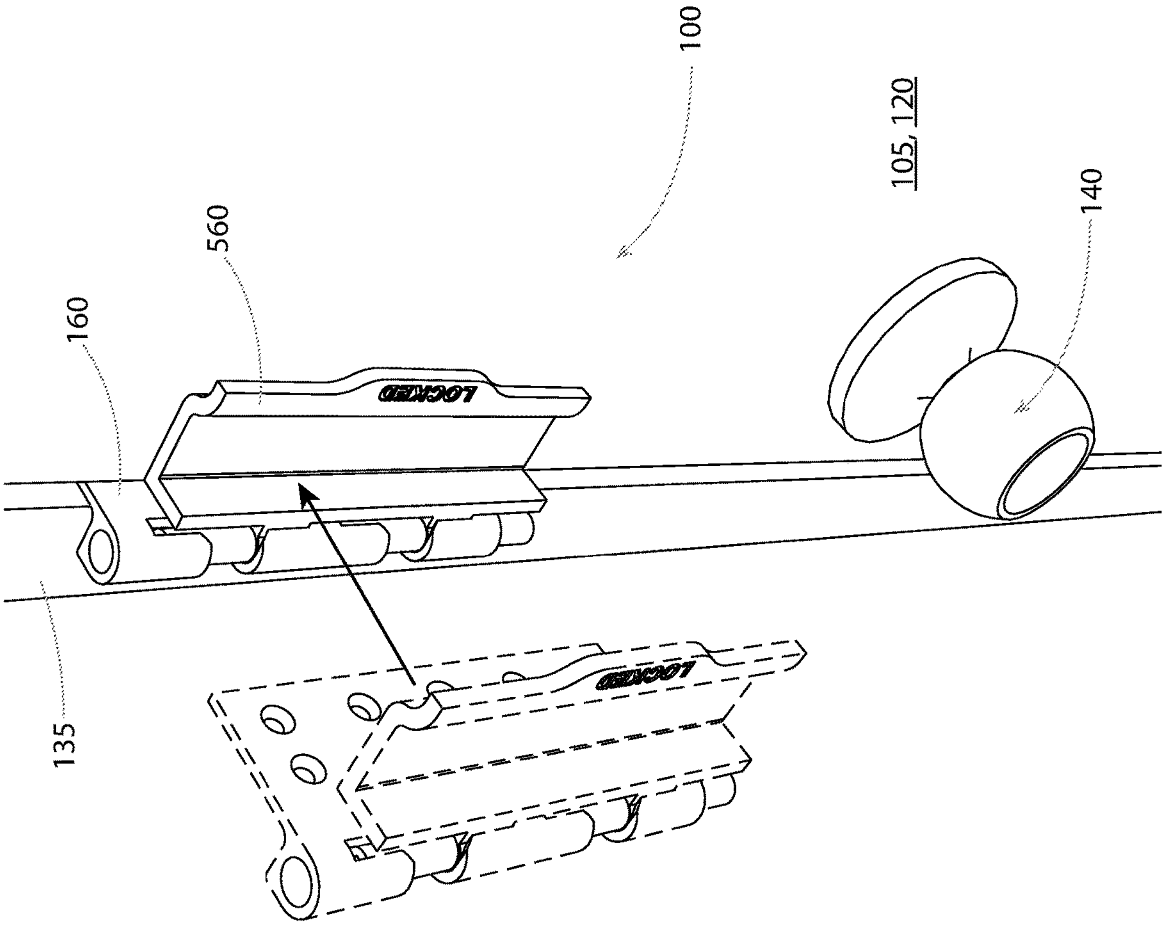
FIGS. 27-30 are partial perspective views showing aspects for installation of the door locking device shown generally in FIG. 1, in an embodiment.
Figure 28:
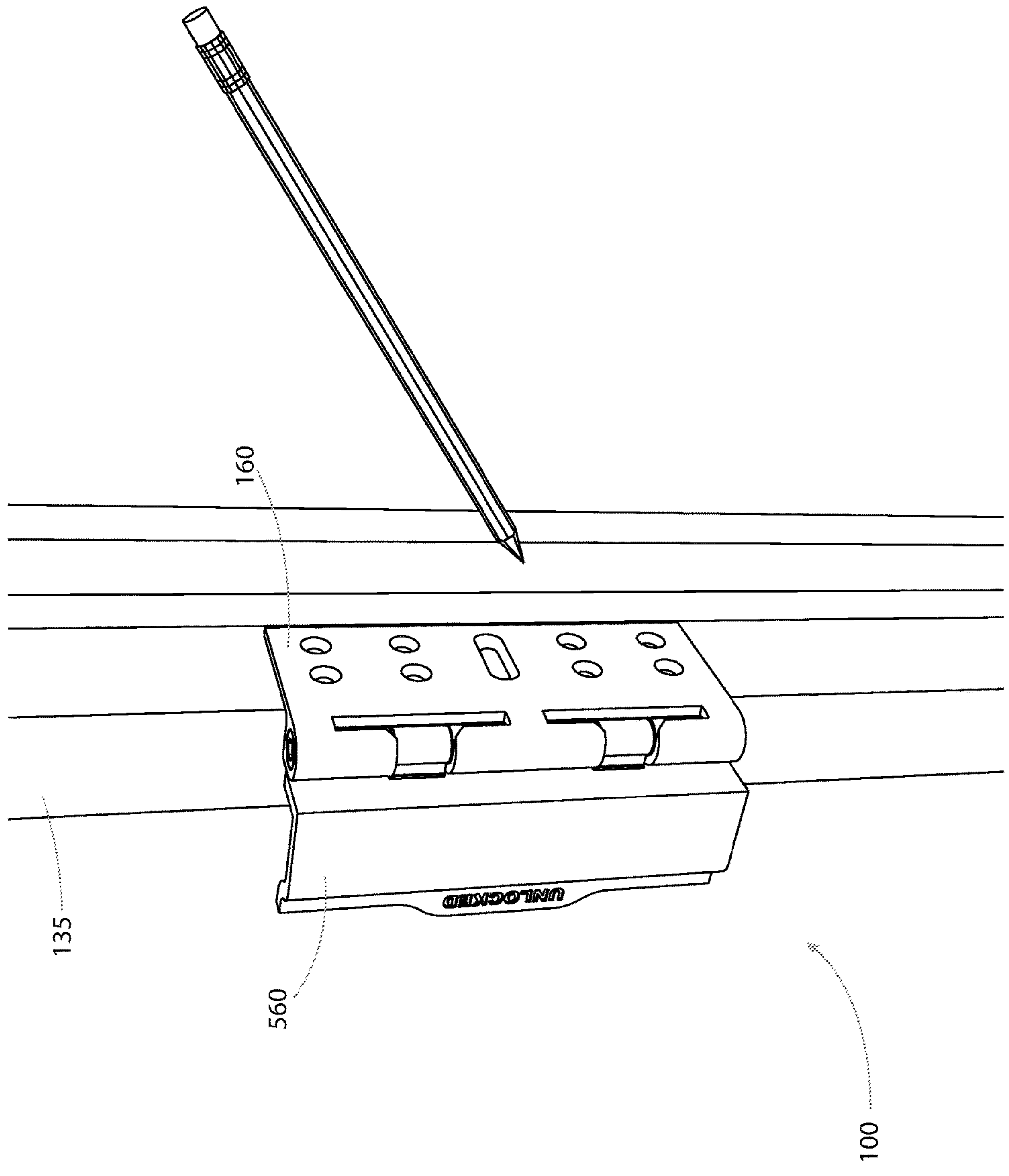
Figure 29:
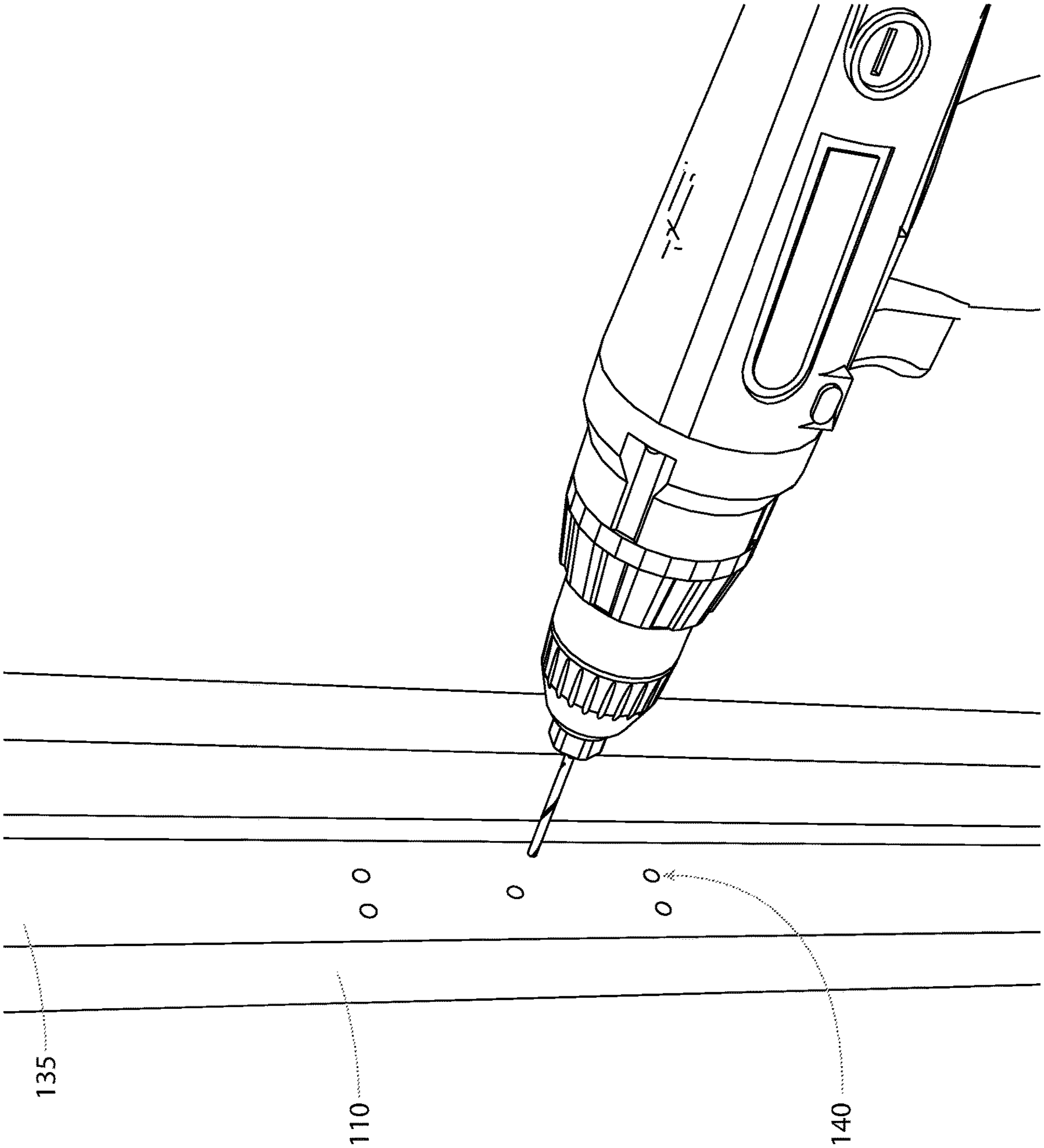

In-swing door 105 (FIG. 26) may include a stile mounted to a set of door hinges (not shown) supported by a door frame 110 (FIG. 1) for pivotal movement about a door hinge vertical axis, between a door closed position (FIG. 26) abutting the door frame 110 and a door open position (FIG. 1) pivoted away from the door closed position. The door closed position is shown in FIG. 26. The set of door hinges (not shown) is mounted to the door frame 110 and door 105, for in-swing movement. Door 105 includes a stile extending parallel to the door hinge vertical axis from a bottom rail to a top rail thereof. The door 105 has a lock stile 112 (FIG. 26) opposite the stile. The door 105 has a door body 115 (FIG. 26) including a planar door exterior surface 122 (FIG. 26) facing the door frame 110. Door 105 has a door interior surface 120 (FIG. 26) facing opposite the exterior surface 122 (shown in FIG. 26). As shown in FIG. 1, the door body 115 has a continuous door peripheral edge 125 extending from the interior surface 120 to the exterior surface 122 (shown in FIG. 26) in intersecting perpendicular relation thereto. The door peripheral edge 125 includes a door inside edge defined along the stile proximate the door hinge vertical axis. As shown in FIGS. 1 and 26, door peripheral edge 125 includes a door outside edge 130 extending vertically and defined along the lock stile 112 in opposed parallel relation to the door inside edge. Door 105 includes a door handle 140 at the lock stile 112, which is operable for manual operation. The door frame 110 includes an elongated first jamb (not shown) extending in the vertical direction in corresponding relationship to the door inside edge (not shown), and in the closed position abutting the inside edge. As shown in FIGS. 1 and 26, door frame 110 includes an elongated second jamb 135 extending in the vertical direction in corresponding relationship to the door outside edge 130, and in the closed position abutting the outside edge 130. Second jamb 135 includes a second jamb interior surface 136 facing the door outside edge 130 in the door closed position (FIG. 26). Second jamb 135 may include a spaced plurality of first device mounting apertures 140 (shown in FIG. 29) defined therein.

Figure 30:
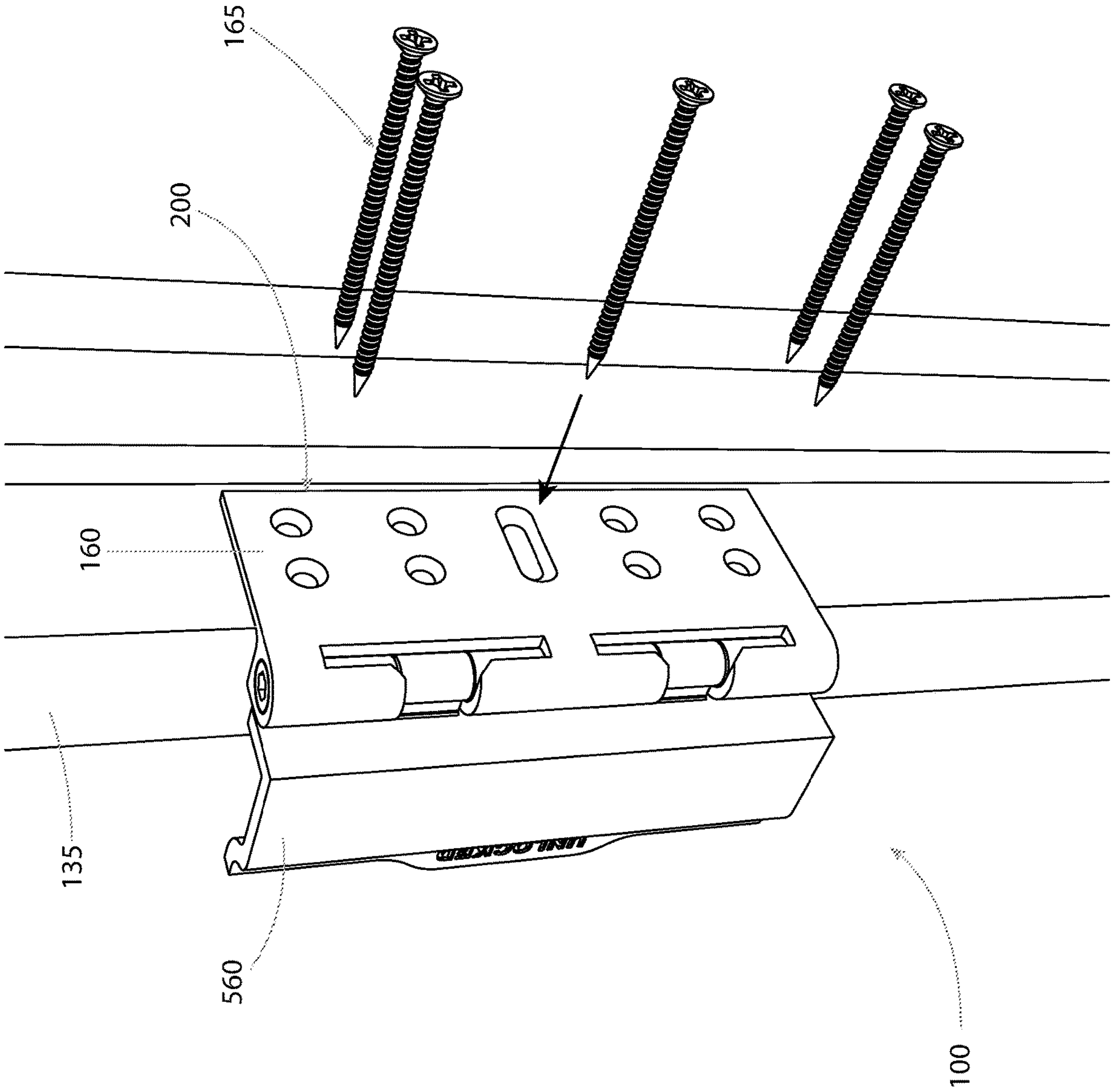
Figure 31:
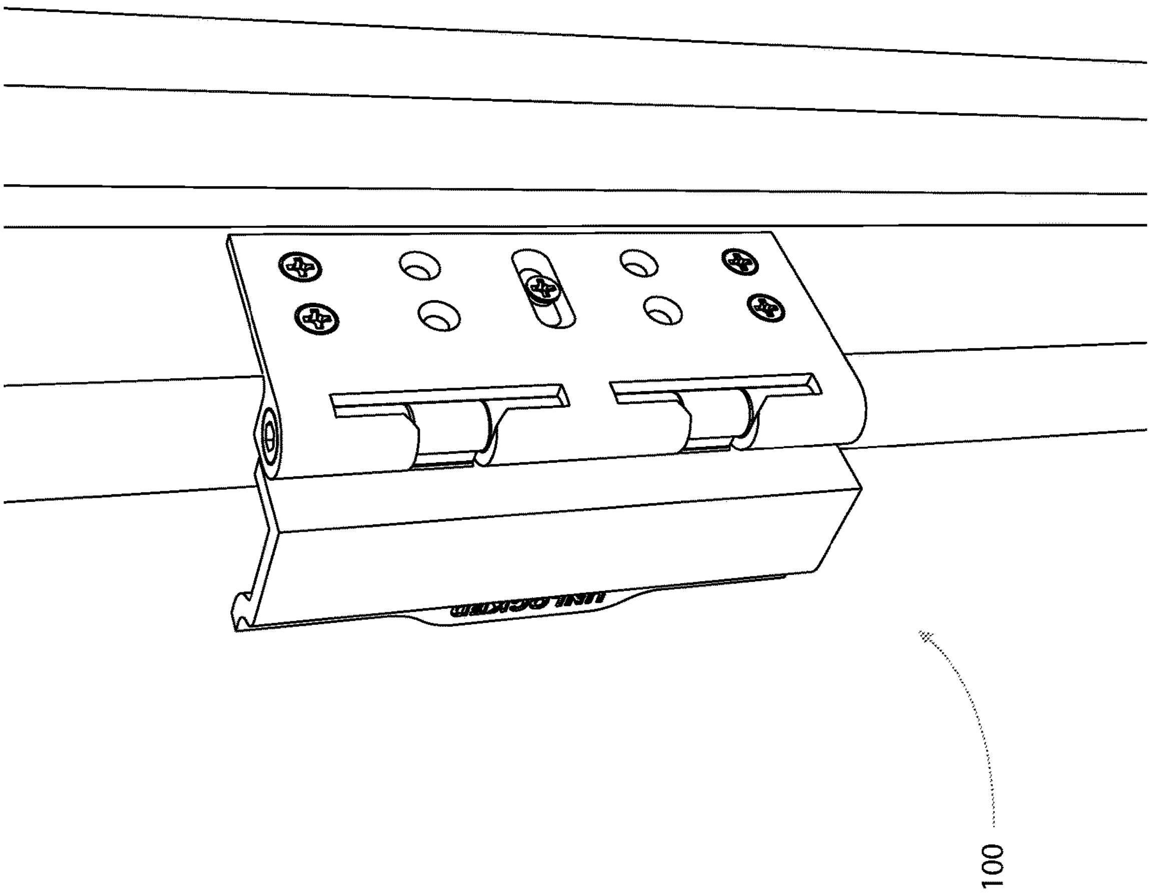
FIG. 31 is a partial perspective view showing the door locking device shown generally in FIG. 1, in use with an in-swing door in open position, with the locking swing plate in locking angular position perpendicular to the mounting plate and in unlocked uppermost position in relation to the mounting plate.

As shown in FIG. 1, door locking device 100 may include a mounting plate 160 configured to be secured to the second jamb 135 at second jamb interior surface 136. Door locking device 100 may include a plurality of male threaded fasteners 165 suitable to secure mounting plate 160 to second jamb 135 against second jamb interior surface 136. Although other suitable fasteners may be used, in the illustrated embodiment, each fastener 165 may be a suitable first threaded fastener, such as an elongated male threaded screw. As shown in FIG. 1, mounting plate 160 may include a spaced plurality of mounting plate apertures 195 each aligned with corresponding of the plurality of first device mounting apertures 140 in second jamb 135 (shown in FIG. 29). Door locking device 100 may include a plurality of the fasteners 165 (FIG. 30) suitable to be received in a corresponding plurality of mounting plate apertures 195 (FIG. 1) and first device mounting apertures 140 (FIG. 29) aligned therewith, which may cooperate to secure mounting plate 160 to second jamb 135 against second jamb interior surface 120.

As shown in FIG. 1, mounting plate 160 may include a first major body 180 having a planar first rear surface 185 configured to abut the door interior surface 120. First major body 180 may have a planar first front surface 190 disposed in opposed parallel relationship to the first rear surface 185. Mounting plate 160 may include the plurality of first mounting apertures 195 extending through the first major body 180 from the first rear surface 185 to first front surface 190 in perpendicular relationship with the same first front and rear surfaces 185,190. First mounting apertures 195 may be positioned in common axial alignment with the first device mounting apertures 140 (FIG. 29) of the second jamb interior surface 136 of second jamb 135 of door frame 110 to receive the first threaded fasteners 165 extending therethrough. The first threaded fasteners 165 (FIG. 1) received in the aligned first device mounting apertures 140 (FIG. 29) in second jamb 135 and first mounting apertures 195 (FIG. 1) of the mounting plate first major body 180 may secure the mounting plate 160 (FIG. 26) against second jamb 135, with the first rear surface 185 abutting second jamb interior surface 136 (FIG. 26) in opposition to first front surface 190 of mounting plate 160 facing the outside edge 130 (FIG. 26) of door 105 in the door closed position of door 105 (FIG. 26).

As shown in FIGS. 26, mounting plate 160 may have a forward vertical edge 200 (shown in FIG. 1) proximate the door outside edge 130 (shown in FIG. 1) in the door closed position, and more particularly proximate the exterior outside corner defined by intersection of the door outside edge 130 with door exterior surface 122. Mounting plate 160 may have a rear vertical edge 203 (shown in FIG. 26) spaced opposite the forward vertical edge 200. Mounting plate 160 may have a planar major external first rear surface 185 disposed in spaced parallel opposition to a planar major internal first front surface 190 extending between forward vertical edge 200 and rear vertical edge 203.

As shown in FIGS. 1-5 and 12-14, mounting plate 160 may have a set of first receiver ears 210 proximate rear vertical edge 203. The set of first receiver ears 210 may be spaced apart along an elongated hinge pin assembly 270 having a hinge pin vertical axis 275. The hinge pin vertical axis 275 is spaced from rear vertical edge 203 of mounting plate 160 and door outside edge 130. More particularly, it will be understood that rear vertical edge 203 of mounting plate 160 is proximate continuous door interior outside corner 205 and spaced slightly outside the swing path of door 105 to provide swing path clearance between door outside edge 130 and the rear vertical edge 203 of mounting plate 160. Referring to FIG. 26, it will be understood that forward vertical edge 200 of mounting plate 160 is proximate an elongated vertical stop surface 137 of second jamb 135 and also spaced slightly outside the swing path of door 105 to provide clearance between the swing path of door outside edge 130 and the forward vertical edge 200 of mounting plate 160. For clarity, as shown in FIG. 26, it will be understood that mounting plate 160 is located in a vertical gap space defined between the door outside edge 130 and the second jamb interior surface 120 of second jamb 135, which faces door outside edge 130. Mounting plate 160 located in the vertical gap space may slightly engage or touch door outside edge 130 in the swing path of door 105 to a limited extent, however mounting plate 160 does not obstruct door 105 to a degree that would prevent door 105 (FIG. 26) from swinging on the swing path between door open position (shown in FIG. 6) and door closed position (shown in FIGS. 2 and 26).

As shown in FIG. 1, mounting plate 160 may include a set of first receiver bays 290 spaced apart along hinge pin vertical axis 275 adjacent the set of first receiver ears 210 in alternating relationship with the first receiver ears 210. Each of the first receiver bays 290 may be defined adjacent a corresponding first receiver ear 210. In the alternative, the first receiver bays 290 may be defined between two adjacent first receiver ears 210, which may include an upper adjacent and lower adjacent of the first receiver ears 210 located on opposite upper and lower sides of first receiver bay 290 therebetween. The set of first receiver bays 290 may be configured to receive in mating relationship a corresponding set of second receiver ears 610 of an adjacent locking swing plate 560. The set of second receiver ears 610 may dock in the set of first receiver bays 290 in registration relationship therewith.

Figure 12:
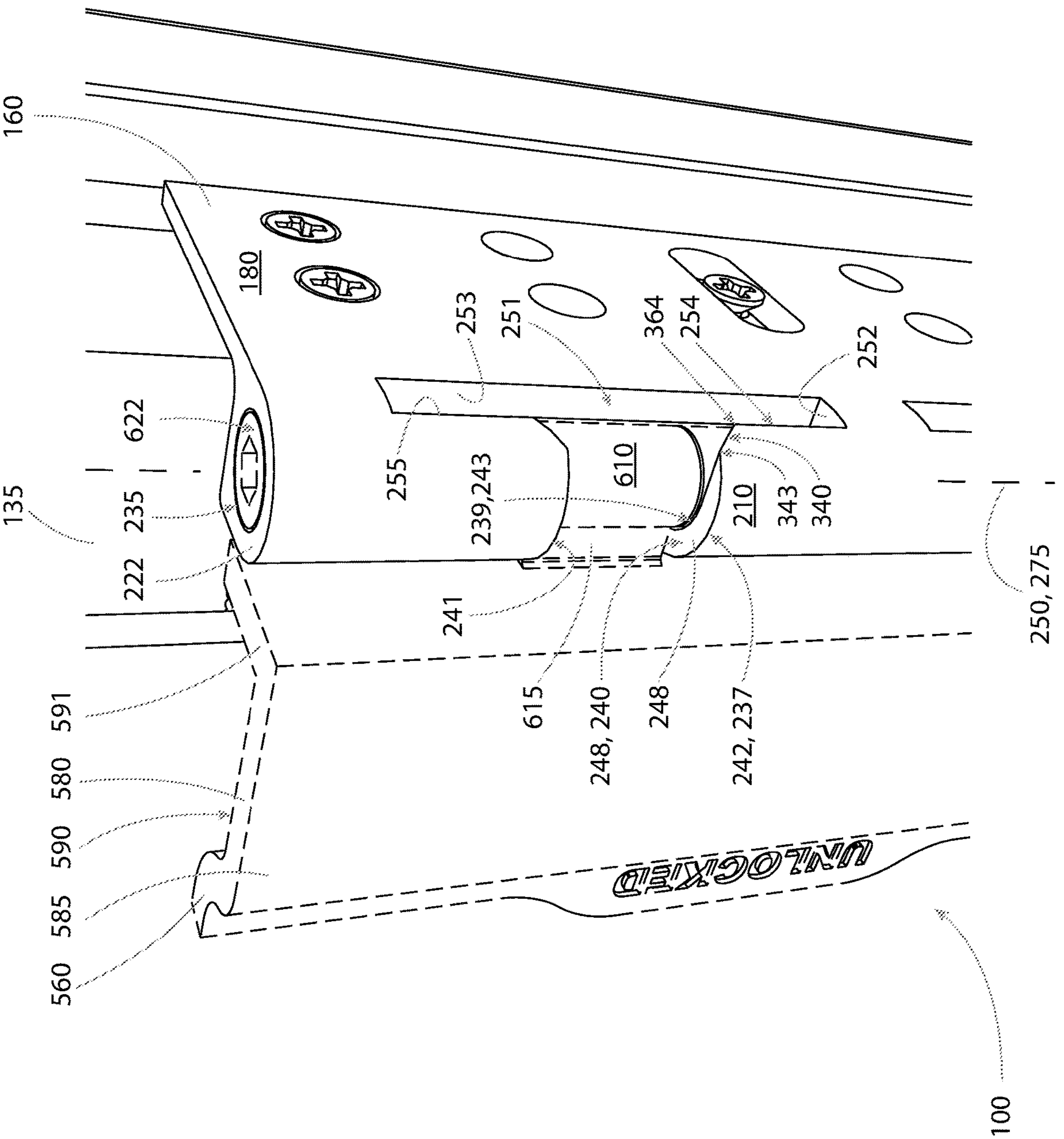
FIG. 12 is an enlarged partial perspective view similar to FIG. 6, with the door locking device generally in unlocked position, with an in-swing door in open position, with the locking swing plate particularly shown in dashed lines in unlocked position at 180 degrees opposite from the locking angular position and in unlocked uppermost position.
Figure 13:
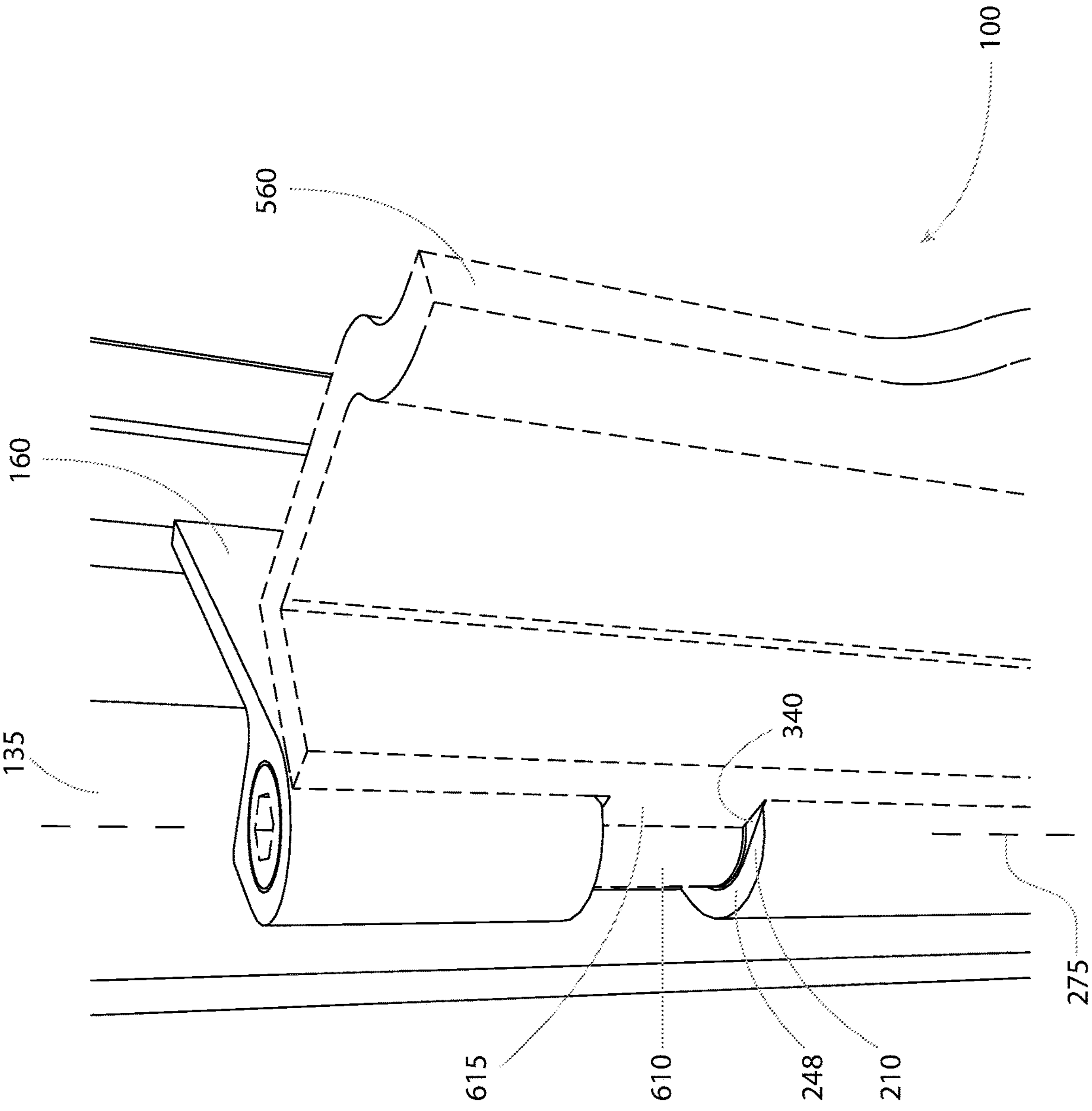
FIG. 13 is an enlarged partial perspective view similar to FIG. 1, showing a door locking device in use with an in-swing door in open position, with the locking swing plate particularly in pre-locking uppermost position and nearing alignment for locking in angular position nearing perpendicular to the mounting plate, in an exemplary embodiment.
Figure 14:
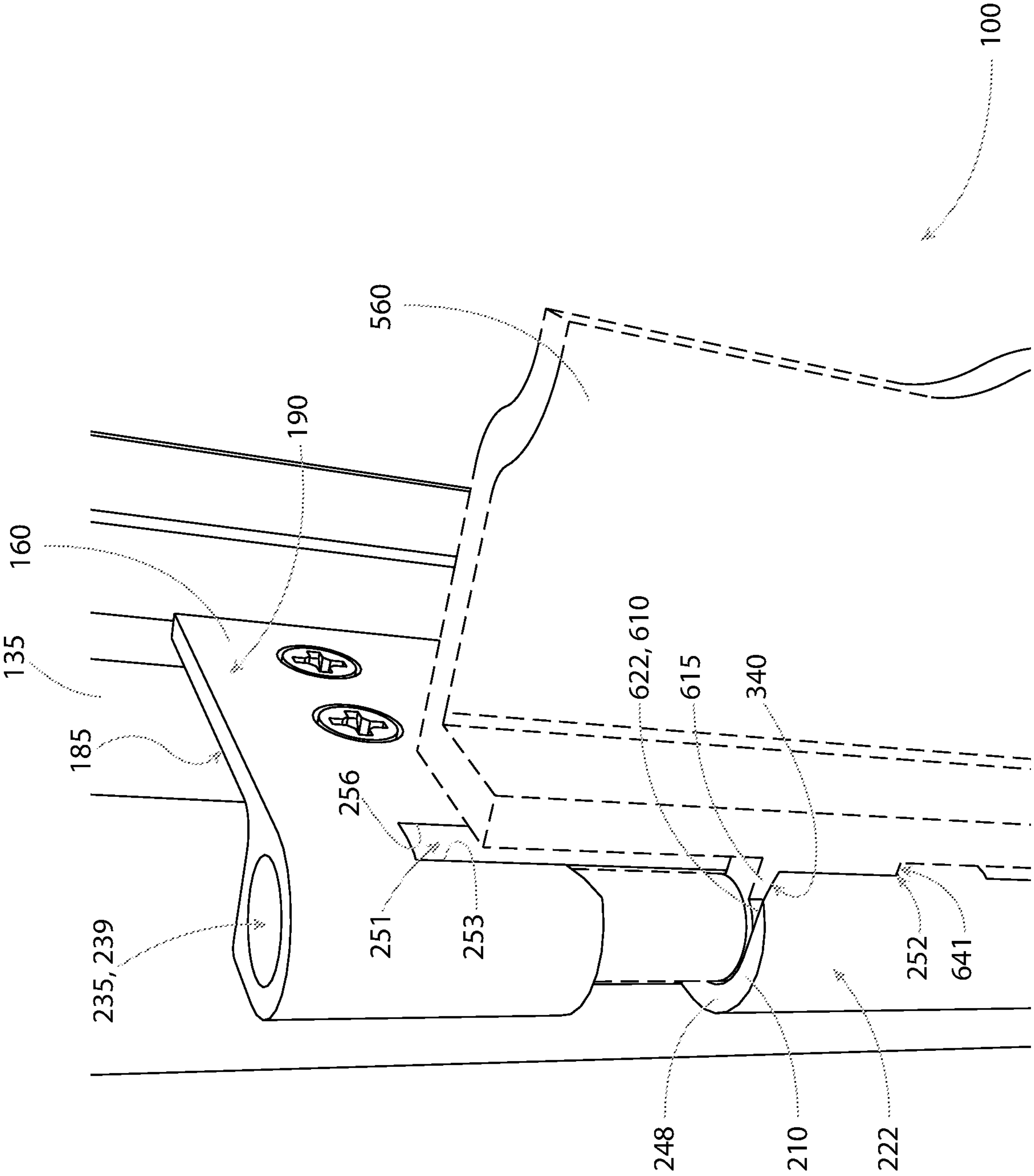
FIG. 14 is an enlarged partial perspective view similar to FIG. 10, with the door locking device generally in locked position with the in-swing door in an open position, with the locking swing plate particularly shown in dashed lines aligned in locking angular position perpendicular to the mounting plate and in locked lowermost position.
Figure 15:
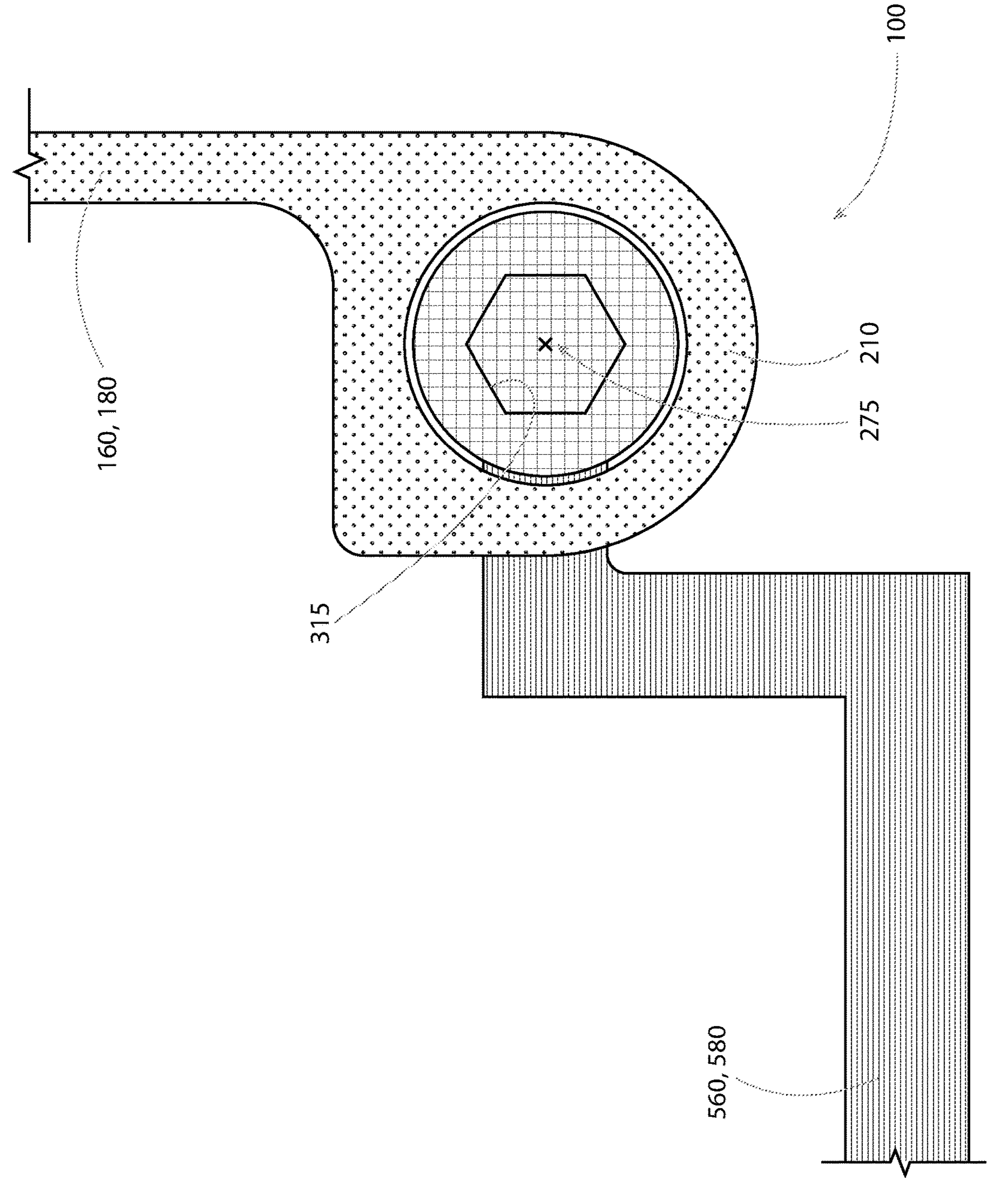
FIG. 15 is an enlarged partial cross-section view showing the door locking device in the unlocked position shown generally in FIG. 2, with the locking swing plate particularly aligned in unlocked angular position at 180 degrees opposite from the locking angular position and in unlocked uppermost position in relation to the mounting plate.
Figure 16:
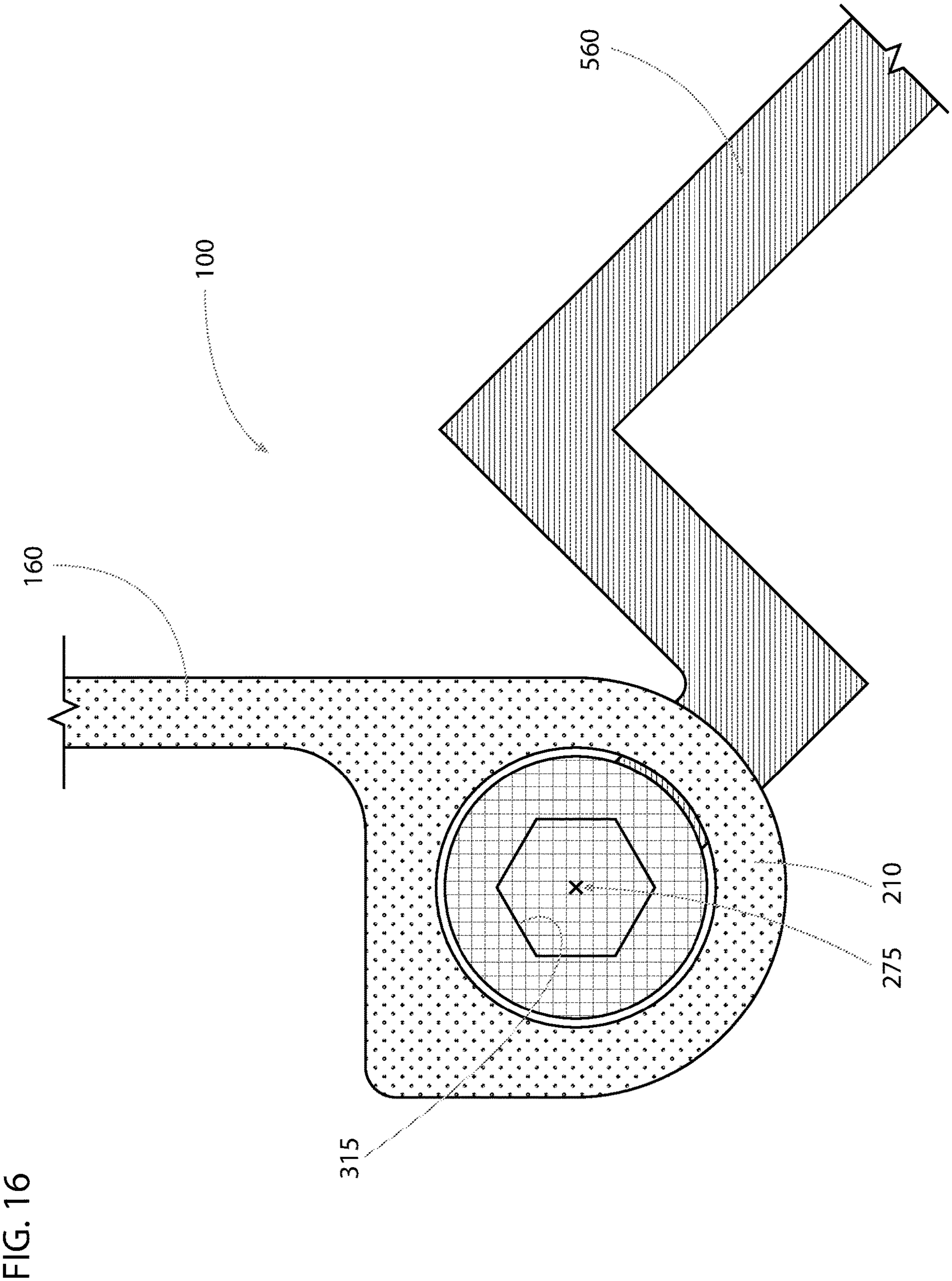
FIG. 16 is an enlarged partial cross-section view similar to FIG. 15, showing the door locking device in an intermediate position, with the locking swing plate particularly aligned in intermediate unlocked angular position at 90 degrees from both the unlocked and locking angular positions and in unlocked uppermost position in relation to the mounting plate.
Figure 17:
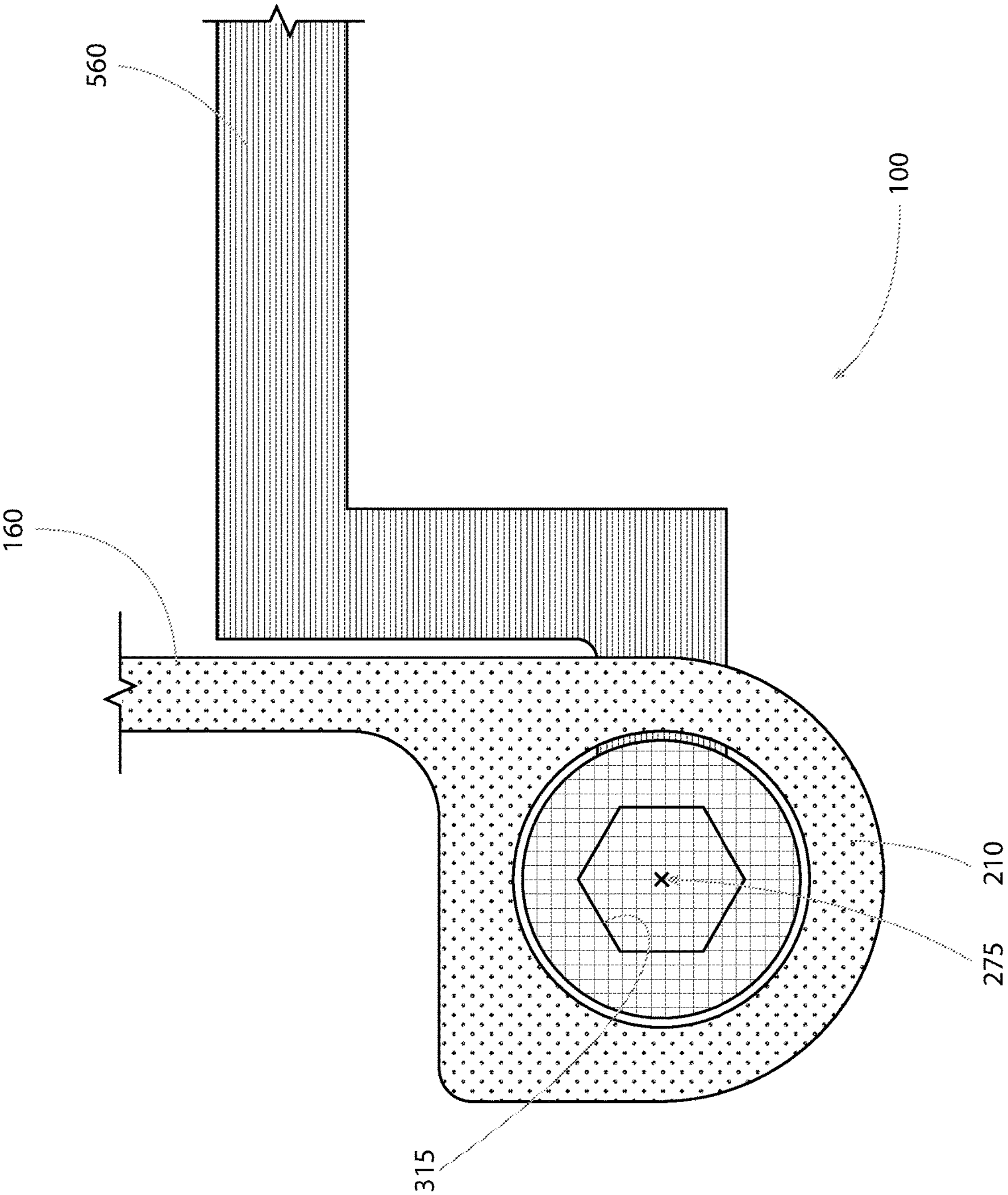
FIG. 17 is an enlarged partial cross-section view corresponding to FIG. 10, showing the door locking device generally in locked position, with the locking swing plate particularly shown in dashed lines aligned in locking angular position perpendicular to the mounting plate and in locked lowermost position in relation to the mounting plate.
Figure 18:
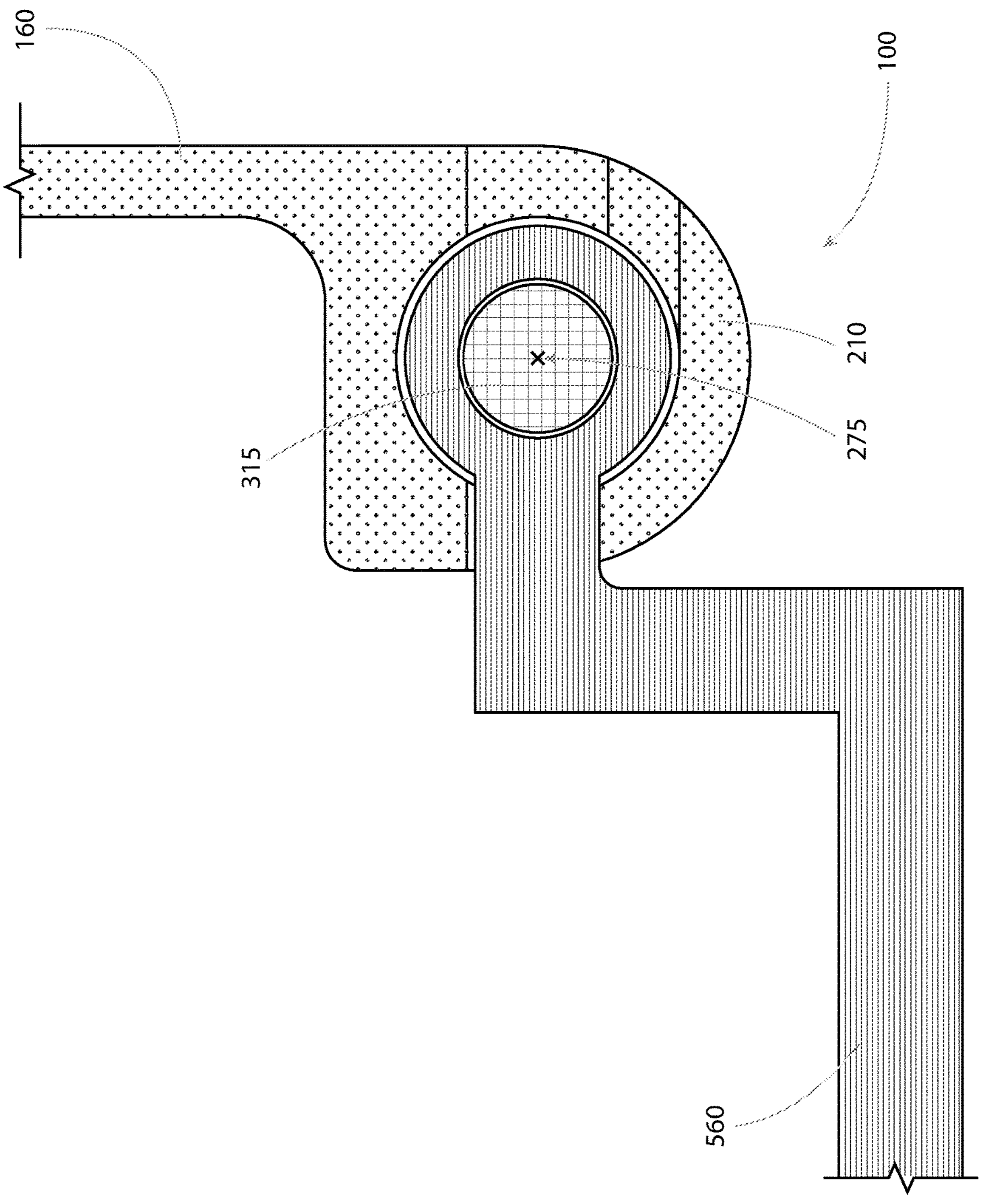
FIG. 18 is an enlarged partial cross-section view showing the door locking device in the unlocked position as shown in FIG. 15, with the locking swing plate particularly aligned in unlocked angular position at 180 degrees opposite from the locking angular position and in unlocked uppermost position in relation to the mounting plate.
Figure 19:
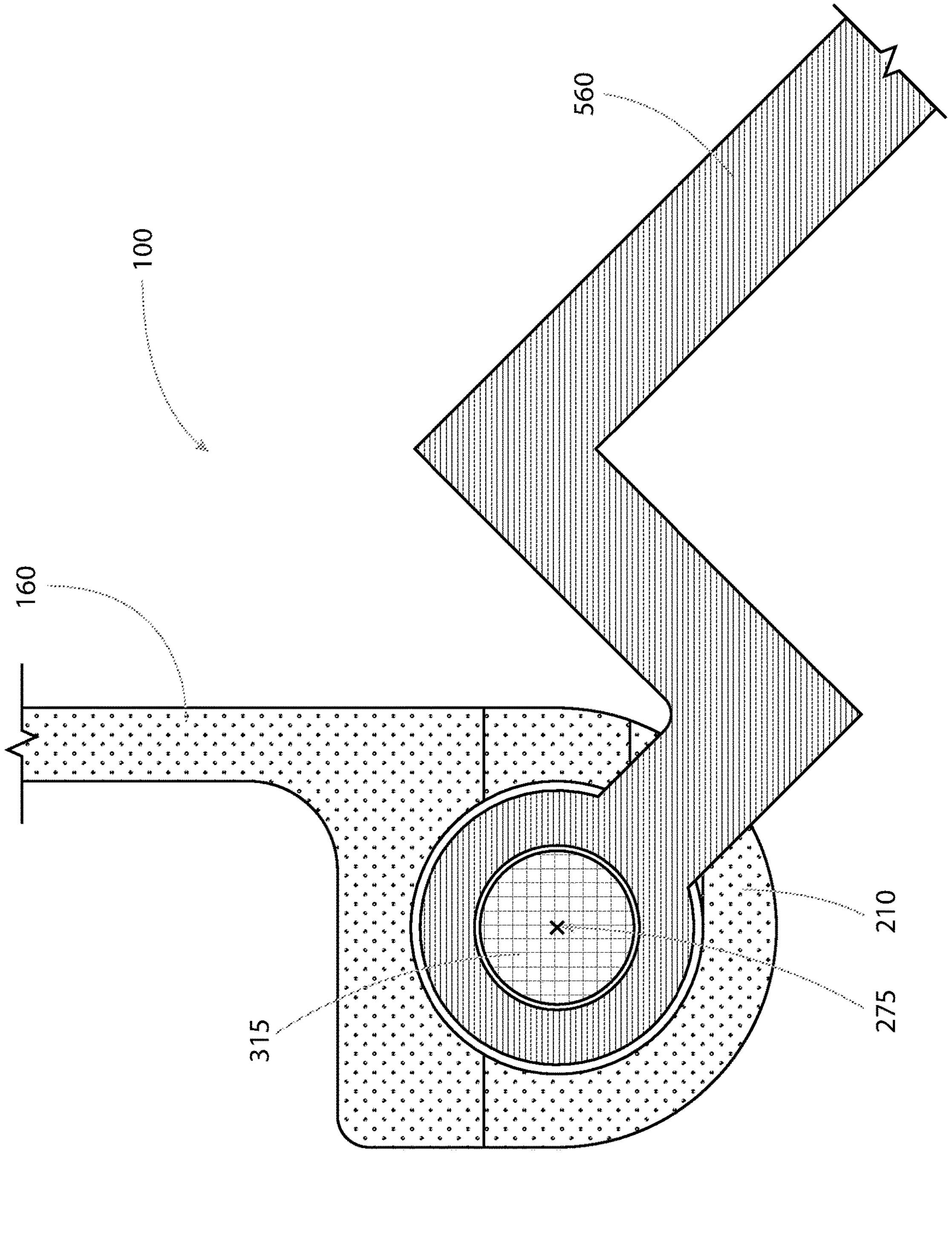
FIG. 19 is an enlarged partial cross-section view similar to FIG. 16, showing the door locking device in an intermediate position, with the locking swing plate particularly aligned in intermediate unlocked angular position at 90 degrees from both the unlocked and locking angular positions and in unlocked uppermost position in relation to the mounting plate.
Figure 20:
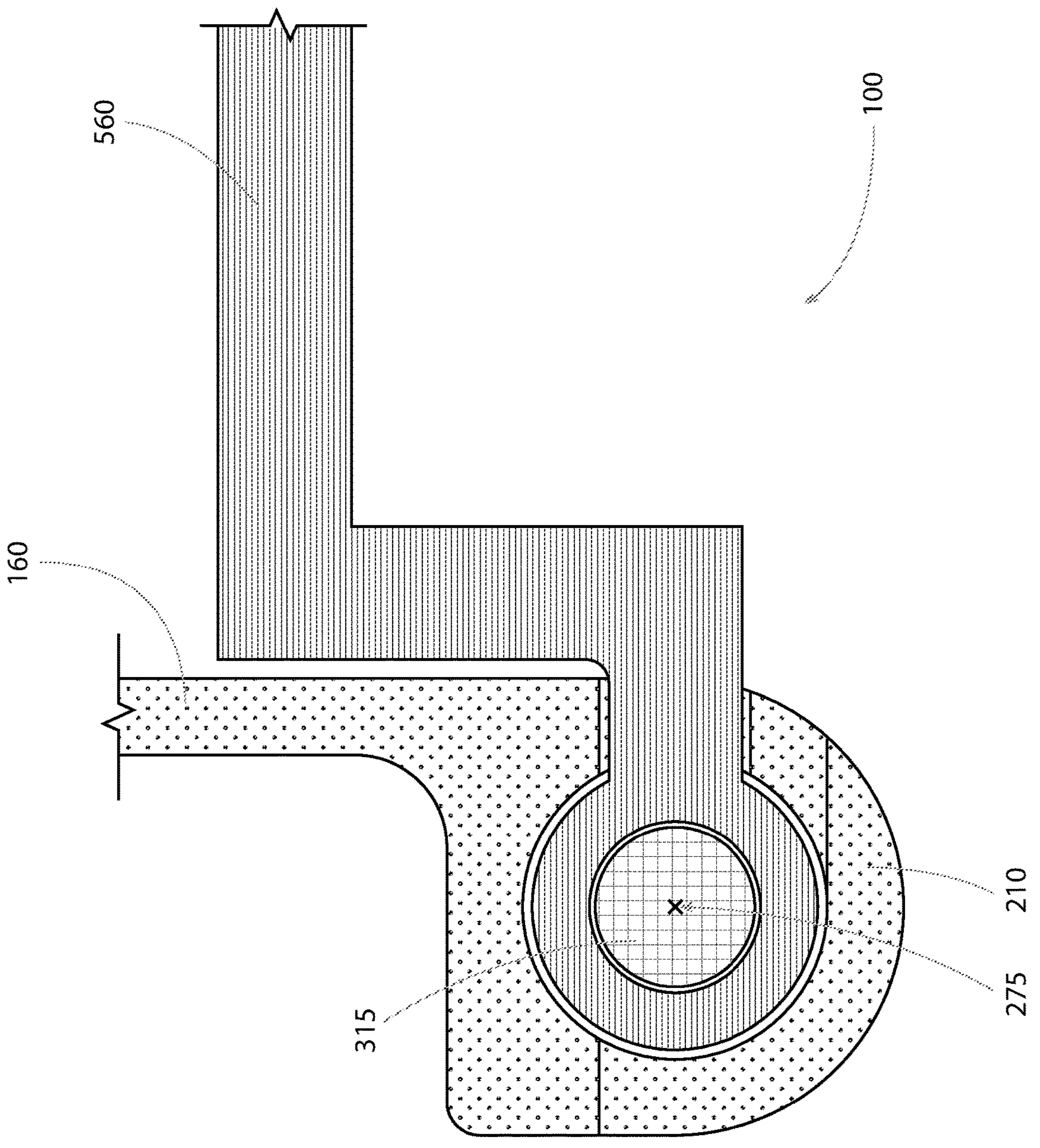
FIG. 20 is an enlarged partial cross-section view similar to FIG. 17, showing the door locking device generally in locked position, with the locking swing plate particularly shown in dashed lines aligned in locking angular position perpendicular to the mounting plate and in locked lowermost position in relation to the mounting plate.
Figure 21:
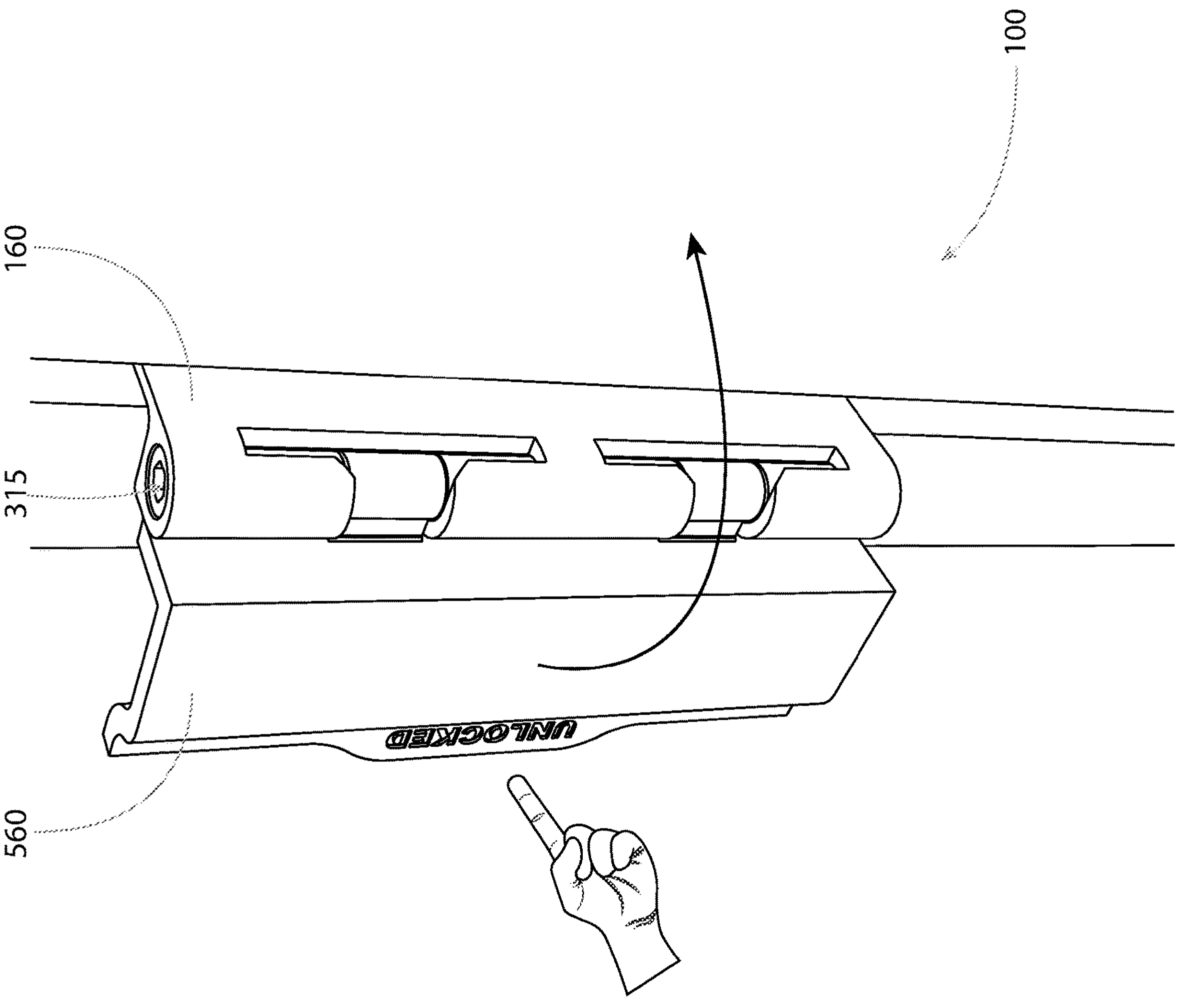
FIGS. 21-25 are partial perspective views showing the door locking device in various positions, with the locking swing plate in various positions in relation to the mounting plate.
Figure 22:
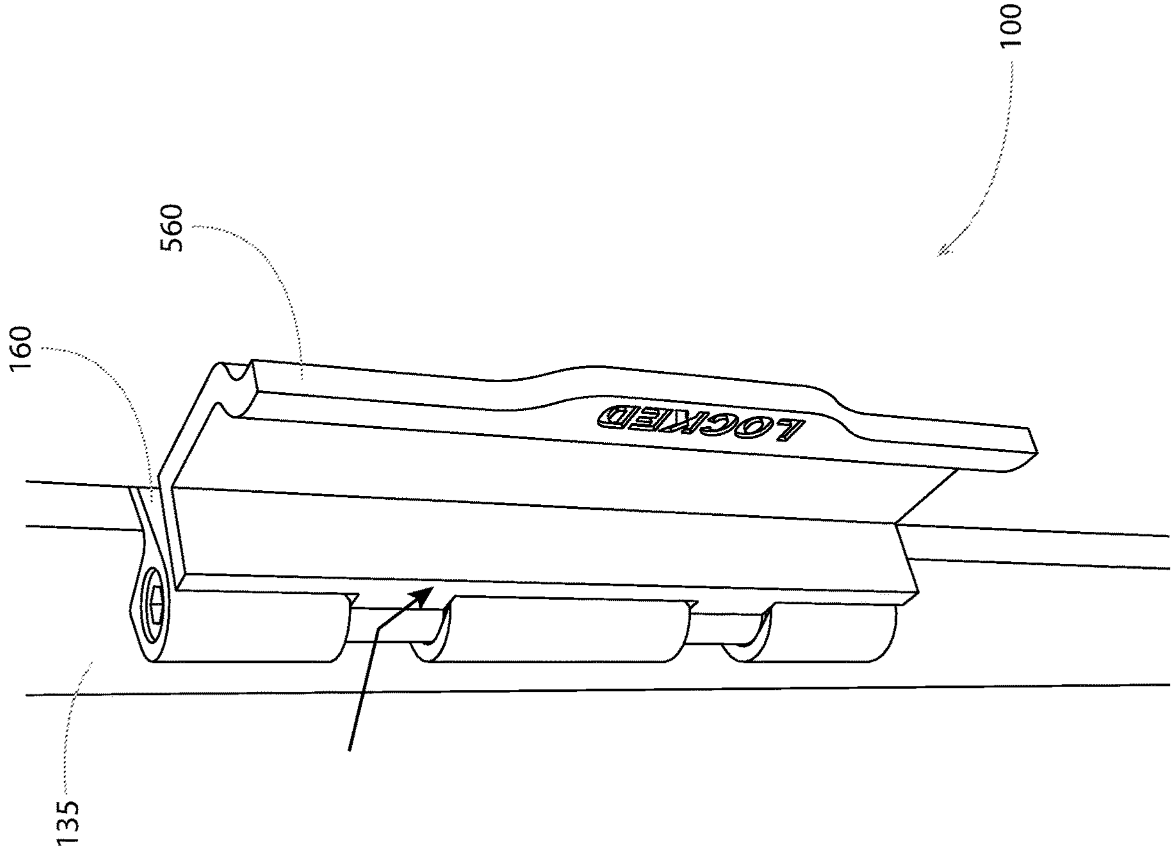
Figure 23:
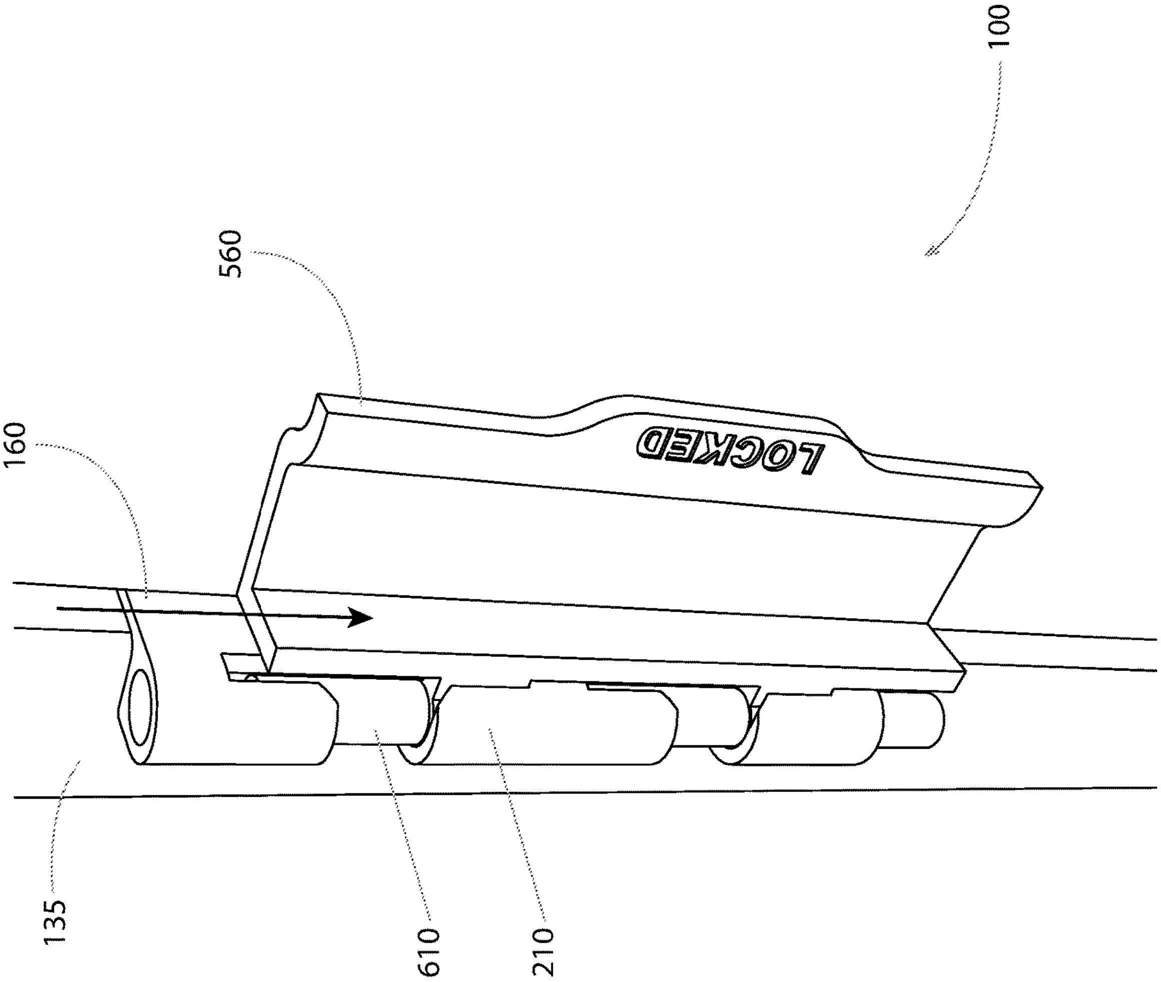
Figure 24:
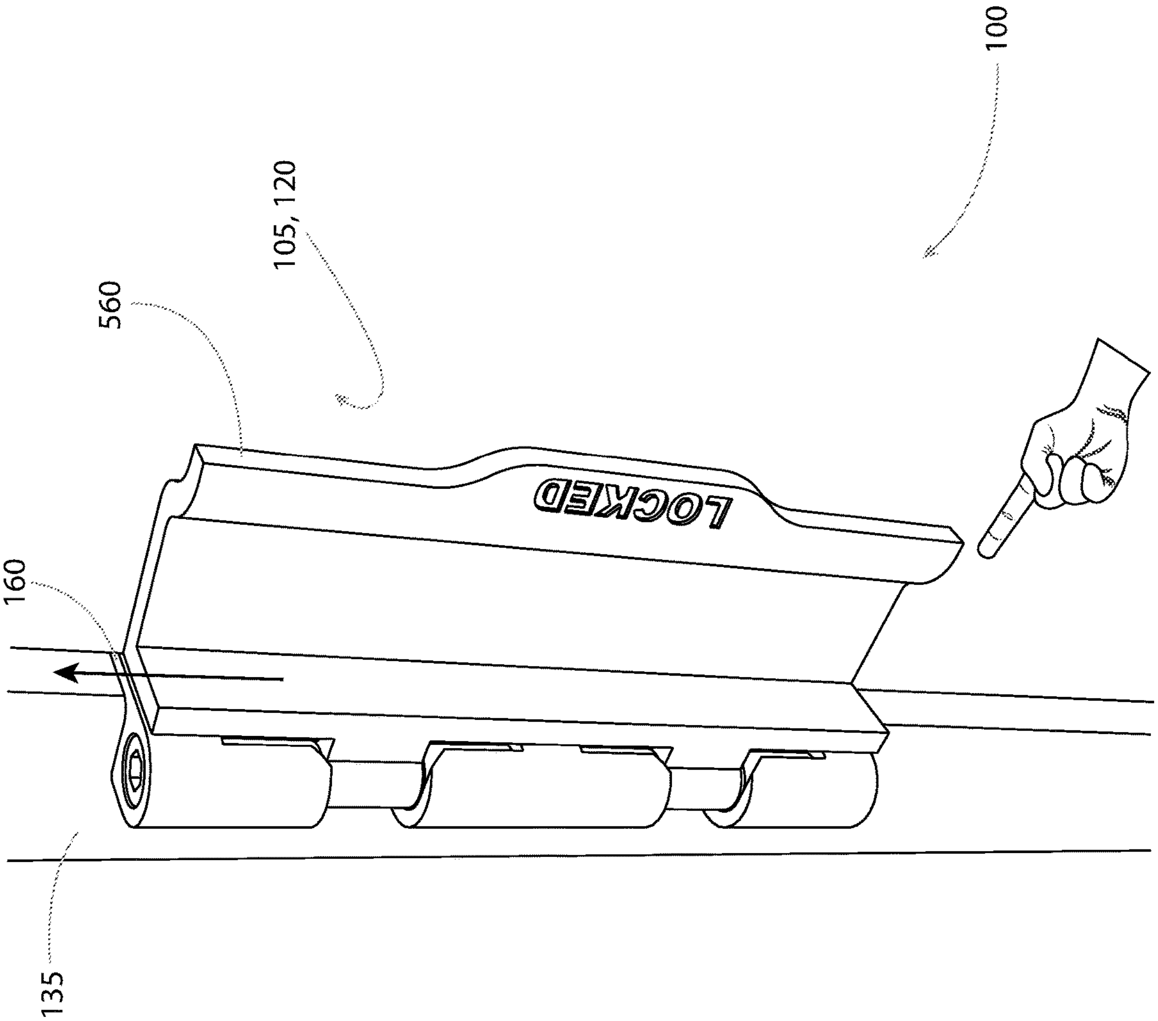
Figure 25:
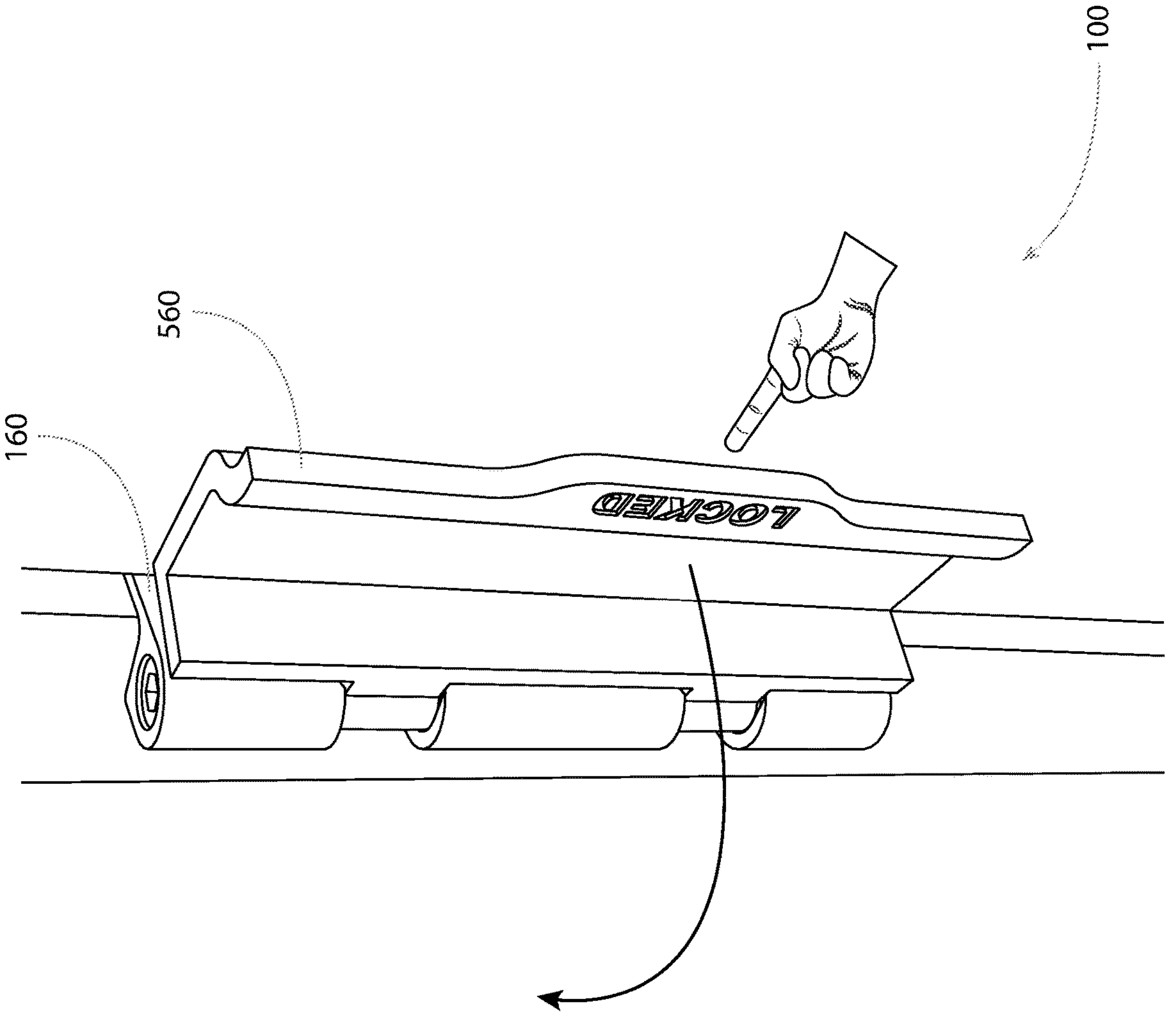

As shown in FIGS. 1-5, and 13-20, first receiver ears 210 may extend from first major body 180 of mounting plate 160 in integral fixed relationship therewith. Referring to FIG. 12, each of the first receiver ears 210 may include a continuous first receiver wall 222 extending in the vertical direction and returning to the first major body 180 to define a first receiver aperture 235. The first receiver wall 222 may have a continuous tubular first receiver inner surface 239 spaced from a first receiver aperture vertical axis 250 and defining the first receiver aperture 235 having a first receiver wall inner radius. The first receiver wall 222 may include continuous first receiver wall outer surface 237 disposed in spaced opposed relationship to the first receiver wall inner surface 239. As shown in FIG. 1, the first receiver wall 222 in the vertical direction may extend from a continuous first receiver top surface 240 to a continuous first receiver bottom surface 241 disposed in spaced opposing relationship. The first receiver wall 222 may terminate at the continuous first receiver top surface 240. The first receiver top surface 240 may extend from the first receiver wall outer surface 237 to first receiver wall inner surface 239 in perpendicular intersecting relationship therewith. As shown in FIG. 12, the first receiver top surface 240 may intersect the first receiver wall outer surface 237 at a continuous first top surface outer edge 242 spaced from the first receiver aperture vertical axis 250 in equidistant relationship at a first receiver wall outer radius. The first receiver aperture vertical axis 250 may be substantially coextensive with hinge pin vertical axis 275. The first receiver wall top surface 250 may intersect the first receiver wall inner surface 239 at a continuous first top surface inner edge 243 spaced from the first receiver aperture vertical axis 250 at the first receiver wall inner radius.

As shown in FIG. 12, the first receiver wall top surface 240 in a radial, lateral direction perpendicular to the first receiver aperture vertical axis 250 may have a first receiver top surface primary width between the first top surface inner edge 243 and the first top surface outer edge 242, which may be a difference between the first receiver wall outer radius and first receiver wall inner radius of first receiver wall 222.

As shown in FIG. 12, the first receiver wall bottom surface 241 may be disposed in spaced opposed relationship to the first receiver wall top surface 240. The first receiver wall 222 may have a substantially uniform width from the first receiver wall top surface 240 to the first receiver wall bottom surface 241. The first receiver wall bottom surface 241 may have a first receiver wall bottom surface primary width between a first bottom surface inner edge 244 and first bottom surface outer edge 247, which may be the difference between the first receiver wall outer radius and the first receiver wall inner radius.

As shown in FIG. 12, the first receiver wall top surface 240 may include a major rest 248 proximate the first front surface 190 of the first major body 180 of mounting plate 160. The major rest 248 may have a major rest height that defines maximum height of the first receiver wall 222 to support the locking swing plate 560 at uppermost position thereof in relation to mounting plate 160. The major rest 248 may support locking swing plate 560 at uppermost position of same by supporting engagement of second receiver ear 610 at uppermost position of same, when locking swing plate 560 is pivoted in relation to hinge pin vertical axis 275 to unlocked position to bring second receiver ear 610 into supported relationship with first major rest 248. Such unlocked angular position, for example as shown in FIG. 12, may be aligned in relation to the hinge pin vertical axis 275 in an angular range from substantially 180 degrees (180°) opposite a locked position of locking swing plate 560 to substantially 90 degrees (90°) in relation to said mounting plate 160.

Figure 11:
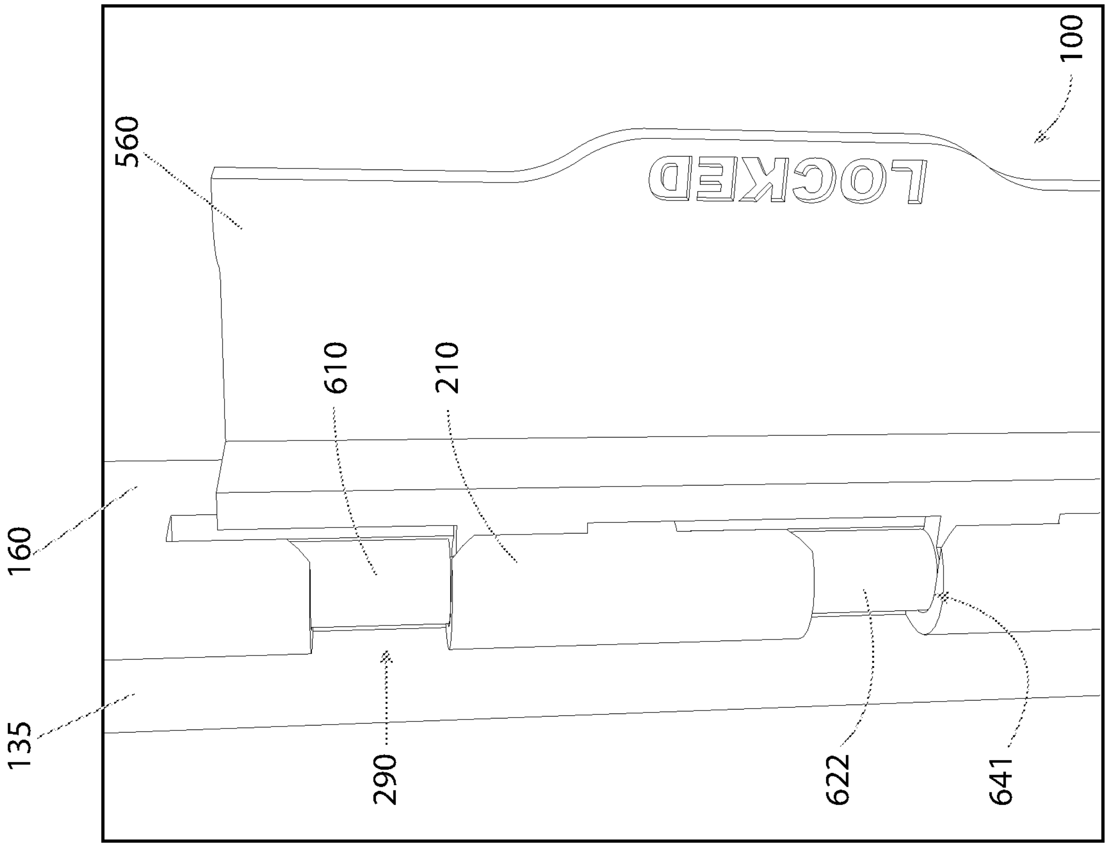
FIG. 11 is an enlarged partial perspective view of the door locking device in FIG. 10.

As shown in FIG. 12 the first receiver wall 222 may include an elongated vertical first locking channel 251 defined in first receiver wall 222 proximate hinge pin vertical axis 275 at an angular position that is substantially ninety degrees (90°) in relation to first rear surface 185 of first major body 180 of mounting plate 160. The first locking channel 251 may interrupt the first receiver wall 222 to form an open gap in the first receiver wall 222 from the first receiver wall outside surface 237 to first receiver wall inside surface 239 and first receiver aperture 235 defined therein. The first locking channel 251 (FIGS. 1 and 12) may be sized to receive therein a first proximal portion or neck 615 of corresponding second receiver wall 622 of second receiver ear 610 in lowermost position (shown in FIGS. 1, 11 and 14) thereof, when locking swing plate 560 in corresponding lowermost position is rotated about hinge pin vertical axis 275 to locked position in perpendicular relationship at substantially ninety degrees (90°) in relation to mounting plate 160. As shown in FIG. 12, the first locking channel 251 at first locking channel bottom wall 252 defining minimum height thereof may provide supporting engagement with second receiver wall bottom surface 641 of second receiver ear 610 at lowermost position (shown in FIG. 11) of same, and thus may support locking swing plate 560 at lowermost position (shown in FIG. 11) in relation to mounting plate 160, when locking swing plate 560 is pivoted to locking angular position (shown in FIG. 11) and aligned in abutting, locking relationship with door interior surface 120 (FIG. 26), in perpendicular relationship at substantially ninety degrees (90°) in relation to first rear surface 185 of mounting plate 160.

Figure 3:
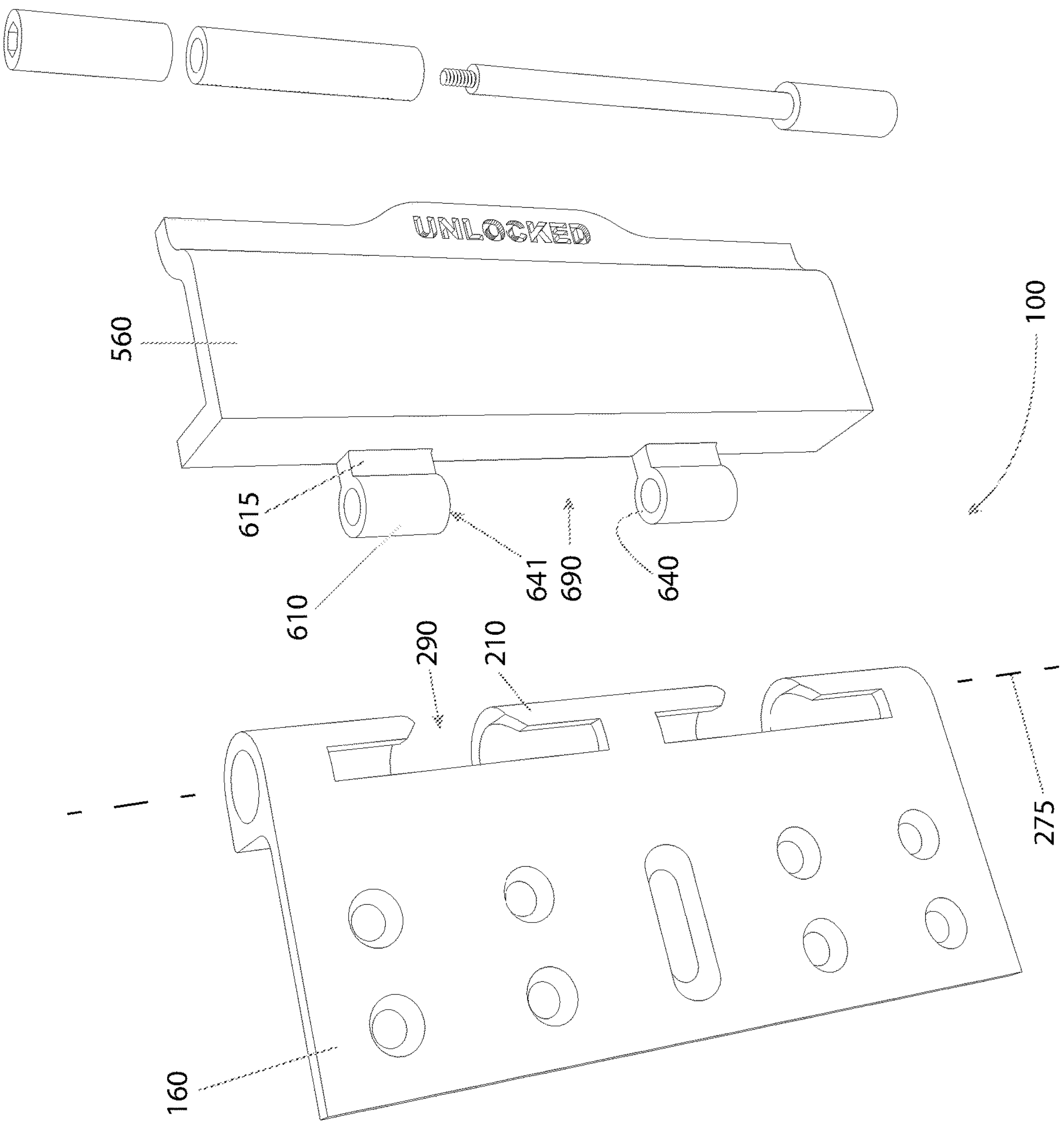
FIG. 3 is a parts side view of components of the door locking device shown in FIGS. 1-2.
Figure 4:
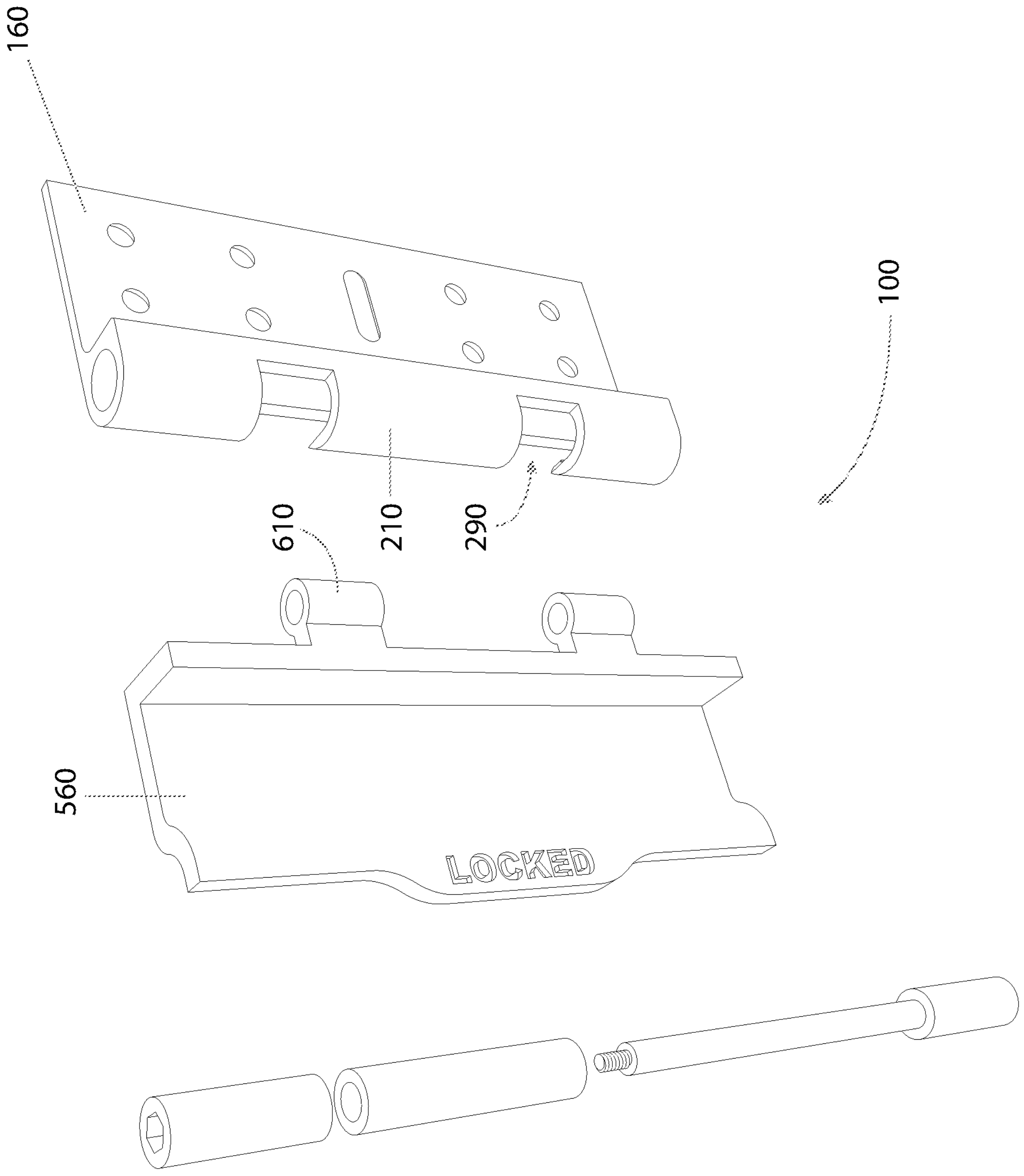
FIG. 4 is a parts view similar to FIG. 3, from a generally opposite side perspective.
Figure 5:
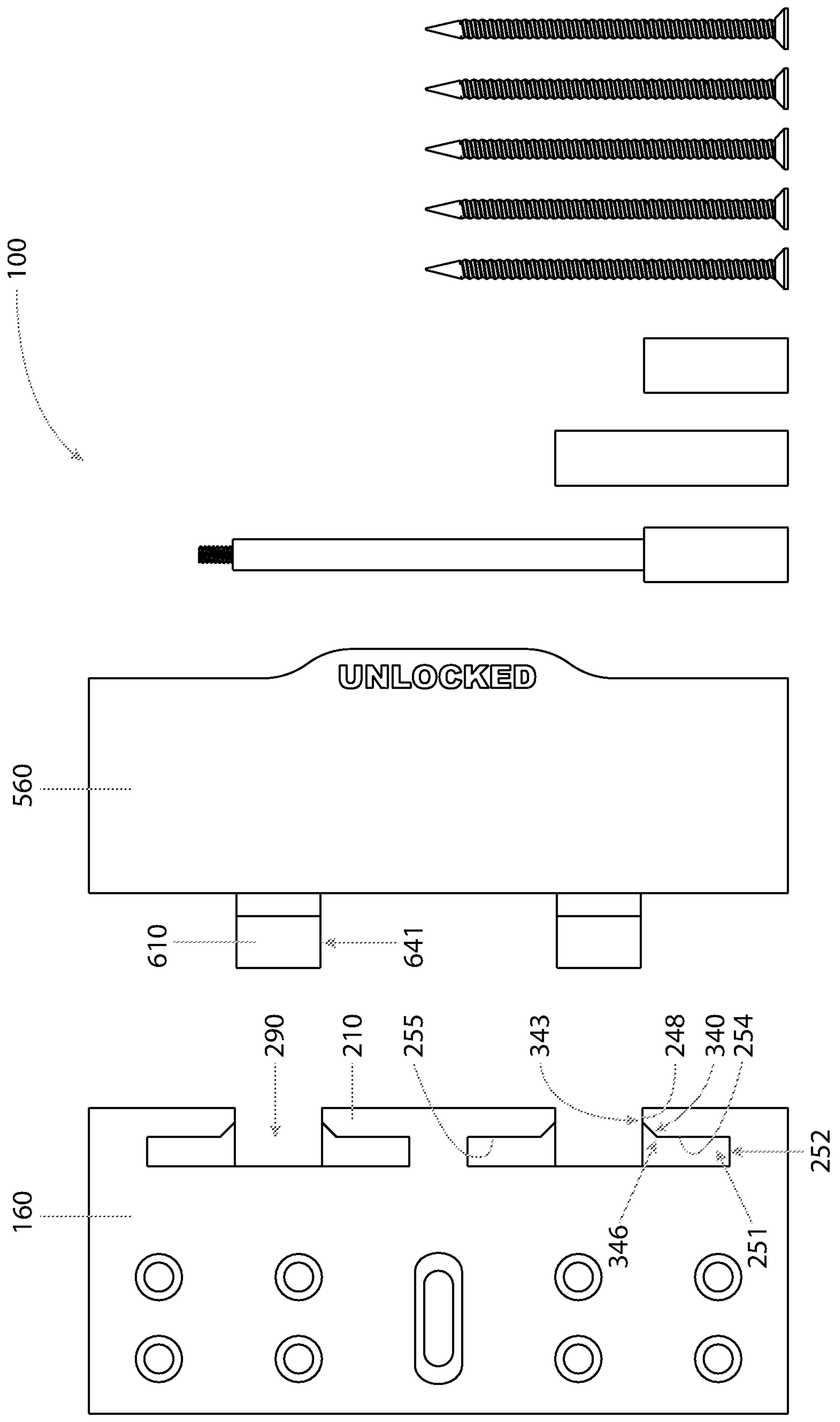
FIG. 5 is an enlarged parts side view of the door locking device shown in FIGS. 1-4.
Figure 7:
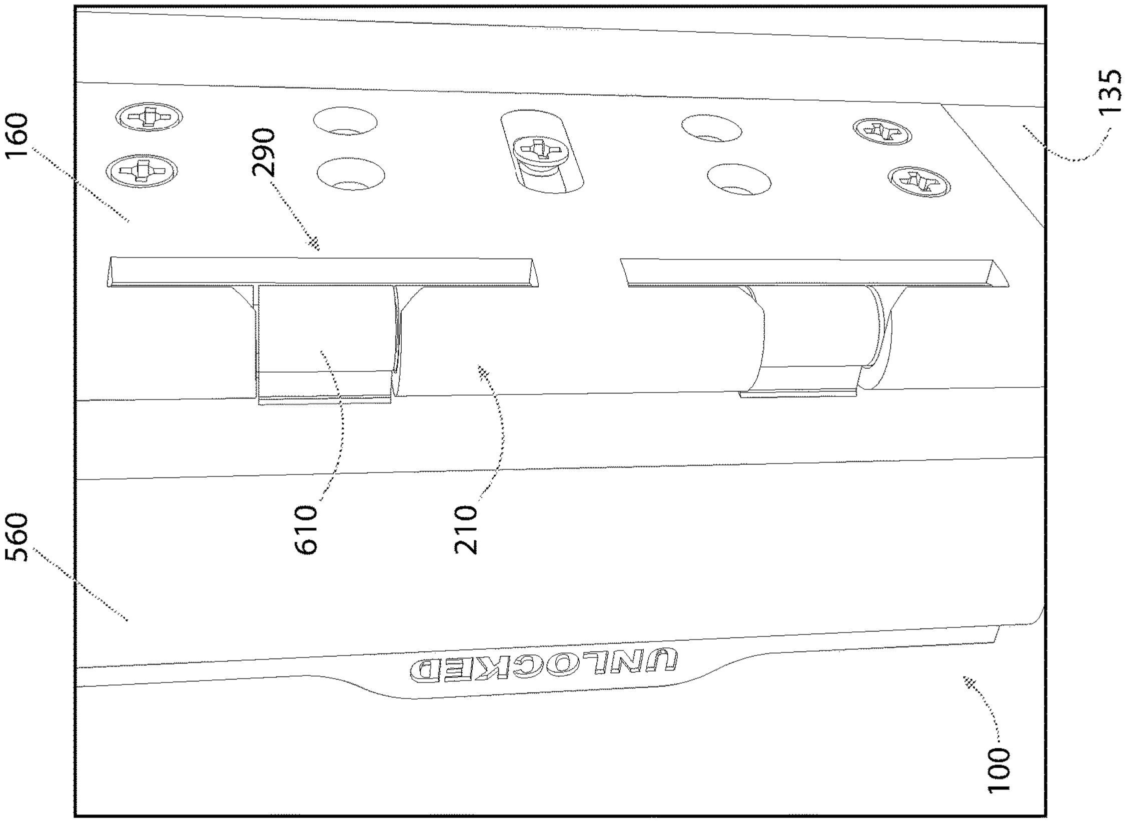
FIG. 7 is an enlarged partial perspective view of the door locking device in FIG. 2.
Figure 6:
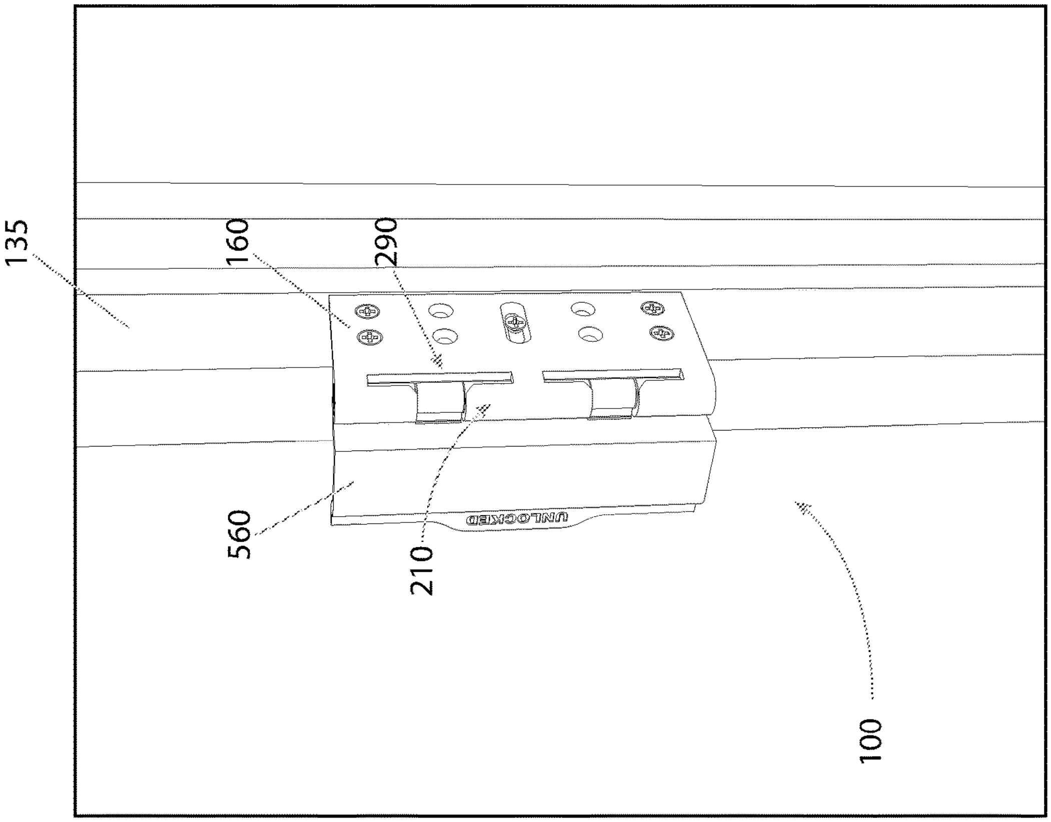
FIG. 6 is a partial perspective view similar to FIG. 2, showing a door locking device in unlocked position, with an in-swing door in open position, in an exemplary embodiment.
Figure 8:
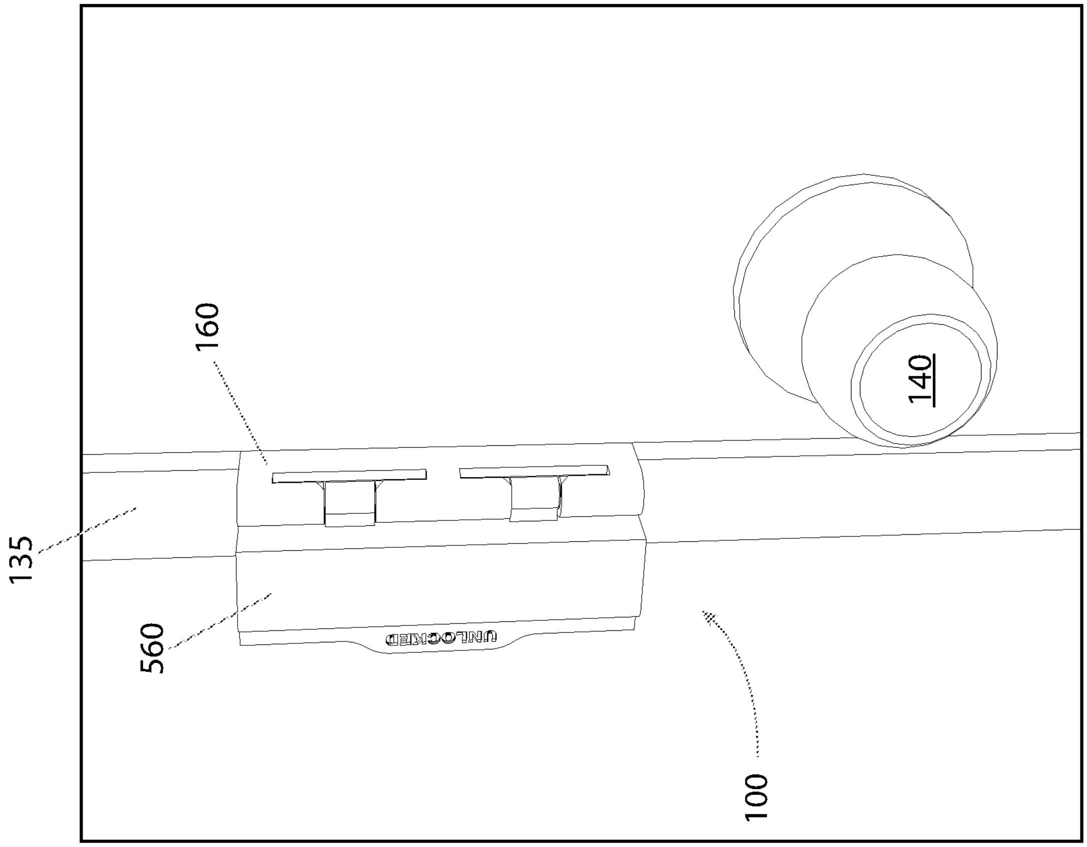
FIG. 8 is a partial perspective view similar to FIG. 6, showing a door locking device in unlocked position, with an in-swing door in closed position, in an exemplary embodiment.
Figure 9:
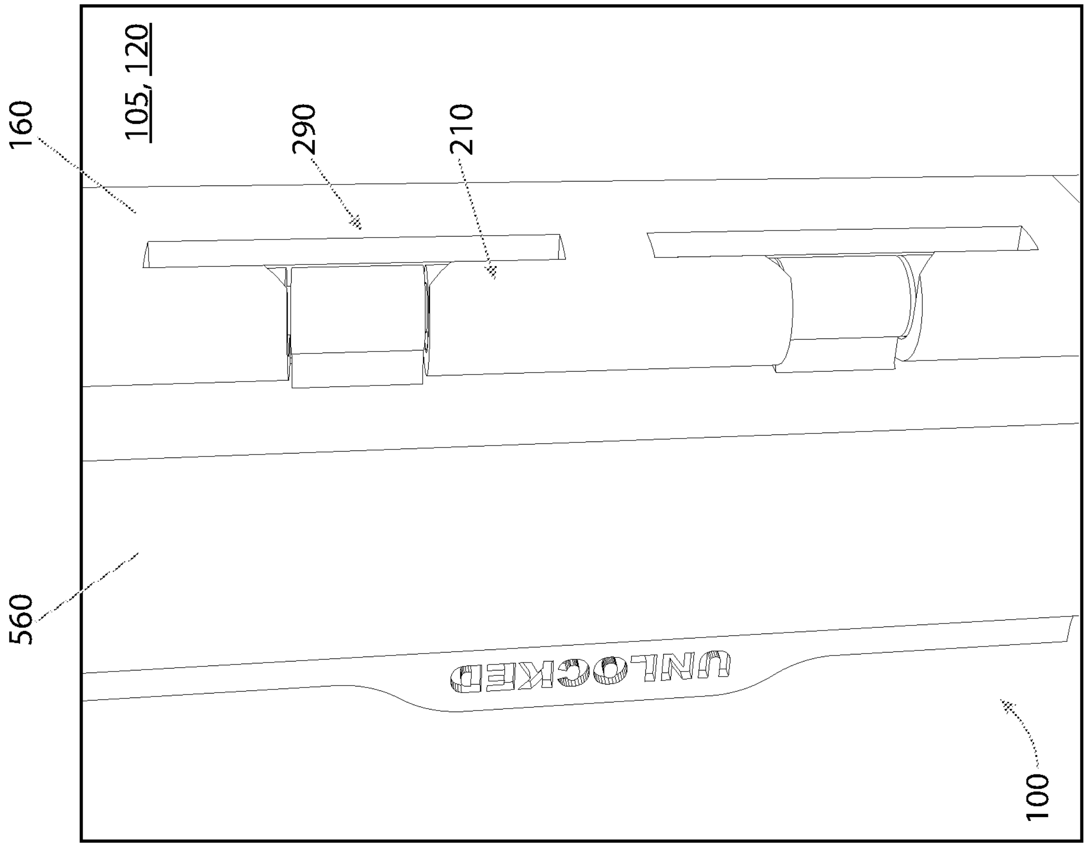
FIG. 9 is an enlarged partial perspective view of the door locking device in FIG. 8.
Figure 10:
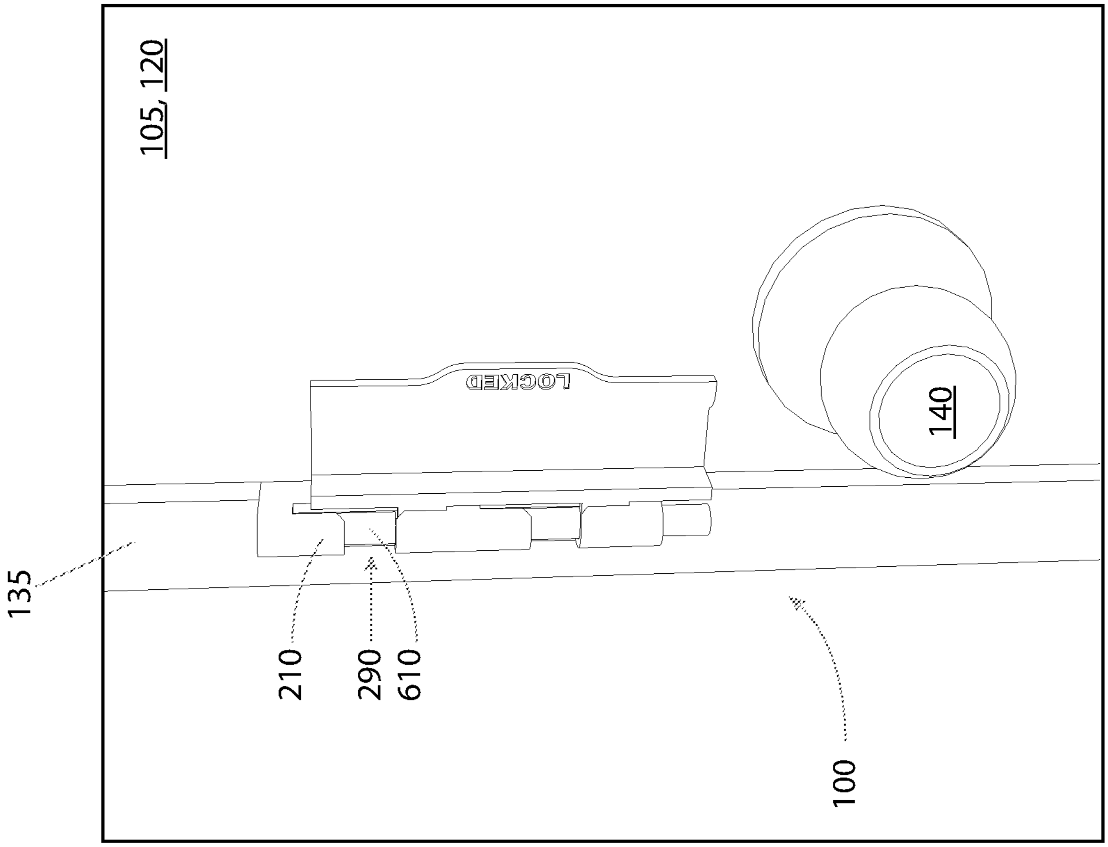
FIG. 10 is a partial perspective view similar to FIG. 8, showing a door locking device in locked position, in use with an in-swing door in closed position, in an exemplary embodiment.

As shown in FIGS. 5 and 12, the first receiver wall 222 at first receiver wall top surface 240 thereof may include an elongated declined slide surface 340 extending from first or upper transition 343 at first major rest 248 at maximum height of first receiver wall top surface 240 downward to second or lower transition 346 at second transition height, where the second transition height is determined to enable corresponding second receiver ear 610 (shown in FIG. 14), by force of gravity on second receiver ear 610, to pass downward from the first major rest 248 at upper transition 343 of declined slide surface 340 (FIGS. 12-14) at first transition 343 and across declined slide surface 340 to clear second transition 346 (FIGS. 12-14), and then to drop in first locking channel 251 (FIG. 14) to rest on first locking channel bottom wall 252 (FIG. 14) thereof when locking swing plate 560 pivots through a range of travel which is in the range of about 180° to about 90° (degrees) relative to hinge pin vertical axis 275, from unlocked position in the uppermost position at substantially one hundred and eighty degrees (180°) opposite from locked position of locking swing plate 560 and thus extending away and outside at ninety degrees)(90° in relation to first rear surface 185 of mounting plate 160, to locked position in the lowermost position perpendicular at ninety degrees (90°) in relation to first rear surface 185 of mounting plate 160 and abutting the door interior surface 120 (FIG. 26). The first declining slide surface 340 at the first lower second transition 346 may introduce the second proximal portion or neck 615 of second receiver wall 622 of the second receiver ear 610 into the vertical first locking channel 251. Referring to FIG. 3, the first locking channel 251 may interrupt the first receiver wall 222, to form an empty, open gap in the first receiver wall 222. The first locking channel 251 may be sized to receive therein a first proximal portion 615 or neck of corresponding second receiver wall 622 of second receiver ear 610 in lowermost position thereof, when locking swing plate 560 in corresponding lowermost position is rotated about hinge pin vertical axis 250 to locked position in perpendicular relationship at substantially ninety degrees (90°) in relation to mounting plate 160. The first locking channel 251 by cooperation of first locking channel major wall 253, opposed first locking channel upper minor wall 255 and lower minor wall 254, and locking channel bottom wall 252, engage the second receiver ear 610 to secure the locking swing plate 560 in locked position, substantially perpendicular to mounting plate 160, in lowermost position in relation to mounting plate 160. Force of gravity biases the second receiver ear 610 and locking swing plate 560 to move into, and to be retained, the lowermost position when locking swing plate 560 is pivoted to locked position and aligned in perpendicular relationship at substantially ninety degrees (90°) in relation to the mounting plate 160. For clarity, the first locking channel major wall 253 and opposed lower minor wall 254 stop the second receiver ear 610 from angular rotation out of the locked angular position that is perpendicular to the mounting plate 160 and abutting the door interior surface 120, when the second receiver ear 610 is received in the first locking channel 250 and moves downward by force of gravity to occupy the lowermost position.

Referring to FIG. 1, the locking swing plate 560 is configured for locking engagement with the mounting plate 160 in locking channel 251 thereof and abutting engagement with door front surface (FIG. 26) 120 to secure door 105 against forced swinging movement from door closed position. Referring to FIGS. 1 and 26, the locking swing plate 560 includes second major body 580 including second front surface 590 disposed in opposition to second rear surface 585. Second rear surface 585 is configured for abutting engagement with door front surface 120 to secure door from forced swinging movement out of the door closed position (FIG. 26). Locking swing plate 560 further includes offset leg 591 extending from second major body 580 to a plurality of second receiving ears 610 configured for connection to hinge pin assembly 315 to locate second rear surface 585 in abutting relationship with door interior surface 120 in the door closed position. Locking swing plate 560 may include the plurality of second receiving ears 610 similar to first receiving ears 210, except having a respective second receiver wall top surface 640 (FIG. 3) that is flat and has uniform height. Locking swing plate 560 may include a plurality of second receiving bays 690 (FIG. 3) similar to first receiving bays 290, except having a respective second receiver bay top surface and bottom surface that are flat and have uniform height. The locking swing plate 560 is configured for vertical translation movement in relation to the mounting plate 160 along hinge pin vertical axis 275. The locking swing plate 560 may occupy or move in relation to an unlocked, uppermost position (shown in FIGS. 2, 6, 7, 8, 9, 12, 15, 18, 21, 28, 30, 31) pivoted substantially perpendicular at substantially zero degrees (90°) in relation to the mounting plate 160 and thus at substantially one hundred and eighty degrees (180°) in opposite relation to the locking or locked angular position. In the unlocked, uppermost position (shown in FIGS. 2, 6, 7, 8, 9, 12, 15, 18, 21, 28, 30, 31) a first major rest 248 of a first receiver ear 210 supports the locking swing plate 560 in the uppermost position relative to a hinge pin vertical axis 275 and mounting plate 160. The locking swing plate 560 also may occupy or move in relation to a locked, lowermost position (shown in FIGS. 1, 10, 11, 14, 17, 20, 23, 26, 27) pivoted substantially perpendicular at substantially ninety degrees (90°) in relation to the mounting plate 160 and thus at substantially one hundred and eighty degrees (180°) in opposite relation to the unlocked angular position. In the locked, lowermost position (shown in FIGS. 1, 10, 11, 14, 17, 20, 23, 26, 27) a first locking channel bottom wall 252 supports the locking swing plate 560 in the lowermost position relative to the hinge pin vertical axis 275 and mounting plate 160. In the locked, lowermost position (shown in FIGS. 1, 10, 11, 14, 17, 20, 23, 26, 27) the first locking channel major wall 253 and opposed lower minor wall 254 stop and retain the second receiver ear 610 in the locked angular position that is perpendicular to the mounting plate 160 and abutting the door interior surface 120, with the second receiver ear 610 received in the first locking channel 250 and biased by force of gravity to occupy the lowermost position. The locking swing plate 560, when pivoted about the hinge pin vertical axis 250 to substantially perpendicular at substantially ninety degrees (90°) in relation to the mounting plate 160, is positioned in substantially parallel, abutting relationship with the door interior surface 120 in the (door) closed position, to lock the door 105 in the closed position in relation to the door frame 110 by obstructing the door 105 from forced in-swing pivoting movement away from the closed position. The first locking channel major wall 253 and opposed lower minor wall 254 stop and retain the locking swing plate 560, at the second receiver ear 610 thereof in lowermost position, in the locked angular position substantially perpendicular to the mounting plate 160 and abutting the door interior surface 120. The locking swing plate 560 is biased by force of gravity to move to the lowermost position and is positively retained in the lowermost position by force of gravity, until manually raised by a user to the uppermost position. The locking swing plate 560, remaining in the same position pivoted at substantially ninety degrees (90°) in relation to the mounting plate 160 and thus positioned substantially parallel to the door interior surface 120 to be locked in abutting engagement with the door interior surface 120, may be removed from the locked, lowermost position locking the door 105 by obstructing the door 105 to prevent forced in-swing movement away from the (door) closed position, only by a user manually raising the locking swing plate 560 from the lowermost position to the uppermost position to clear the lower minor wall 254 and be removed from the first locking channel 250 to be supported on the first major rest 248 defined on first receiver wall top surface 240.

The locking swing plate 560 is biased by force of gravity for vertical translation movement to the lowermost position from the uppermost position when extending parallel to the door interior surface 120 and perpendicular to the mounting plate 160 in locking angular position in abutting relationship with the door interior surface 120 of door 105 in the (door) closed position in relation to the door frame 110. The locking swing plate 560 is retained in the lowermost position by the gravity biasing force to lock the locking swing plate 560 in abutting, locking relationship with the door interior surface 120. The locking swing plate 560 may be moved out of the locked, lowermost position by being manually raised.

As shown in FIGS. 1 and 8-11, the locking swing plate 560 on opposite surfaces thereof may include a prominent display of visual indicia 565 to provide visual indication that the locking swing plate 560 is located in the unlocked angular position (shown in FIGS. 6-7) or locking angular position (shown in FIGS. 8-9) in relation to mounting plate 160 and door interior surface 120.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiments, methods, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. A door locking device for securing an in-swing door against forced entry, the in-swing door mounted to a door hinge supported by a door frame, the door supported on the door hinge for in-swing pivotal movement about a door hinge vertical axis between a door closed position abutting the door frame and a plurality of door open positions apart therefrom, the door having a lock stile opposite the door hinge, the door having a door body including a door interior surface facing the door frame, the door having a door exterior surface facing opposite the door interior surface, at the lock stile the door having a vertically elongated door outside edge extending in the vertical direction between the door interior surface and the door exterior surface in intersecting perpendicular relationship therewith, proximate the door hinge the door frame having an elongated first jamb extending in the vertical direction, proximate the door outside edge the door frame having an elongated second jamb extending in the vertical direction, the second jamb having an elongated second jamb interior surface extending in the vertical direction, in the door closed position the second jamb interior surface extending in corresponding parallel opposed relationship to the door outside edge, the second jamb having an elongated second jamb stopping surface extending in the vertical direction, the second jamb stopping surface intersecting the second jamb interior surface in perpendicular relationship therewith, the second jamb stopping surface thus defining a stopping projection adjacent the second jamb interior surface that terminates swinging travel of the door in the door closed position, in the door closed position along the door outside edge the second jamb stopping surface abutting the door exterior surface in corresponding parallel opposed relationship to same, said door locking device comprising:

a mounting plate having a mounting plate major body configured to be secured to the second jamb interior surface by a plurality of first threaded fasteners extending from said mounting plate into the second jamb;

said mounting plate having a first receiver wall extending from the mounting plate major body in spaced relationship to the second jamb, said first receiver wall defining a receiver space to receive a locking swing plate configured for pivoting movement about a hinge pin about a hinge pin vertical axis, said first receiver wall having a first receiver top surface in a radial direction perpendicular to a first receiver aperture vertical axis;

said first receiver wall having a first receiver bottom surface disposed in spaced opposed relationship to said first receiver top surface;

said first receiver top surface comprising a first major rest spaced apart from said mounting plate major body, said first receiver comprising a declining slide surface and first locking channel between said first major rest and said mounting plate major body, said first major rest having a major rest height defining a maximum height of said first receiver wall;

said first receiver top surface comprising a locking channel bottom wall located at substantially ninety degrees (90°) in relation to said first inner surface of said mounting plate major body, said locking channel bottom wall having a locking channel bottom height defining a minimum height of said first receiver wall;

said first receiver top surface comprising a locking channel lower wall transition located at substantially ninety degrees (90°) in relation to said first inner surface of said mounting plate major body, said locking channel lower wall transition having a lower wall transition height defining a transition height of said first receiver wall;

said first receiver top surface comprising a declining slide surface having an upper end intersecting said major rest at said major rest height, said declining slide surface having a lower end intersecting said locking channel lower wall at said lower wall transition height;

said first receiver wall comprising said locking channel defined therein, said locking channel extending along a locking channel vertical axis, said locking channel comprising a locking channel major vertical wall opposite said locking channel minor lower wall, said declining slide surface and said locking channel minor upper wall, said declining slide surface at said lower wall transition introducing said neck portion of said second receiver into said locking channel defined therebetween, said locking channel comprising an open slot extending through said first receiver wall;

said locking swing plate configured for pivoting movement about said hinge pin vertical axis between a locking angular position and unlocked angular position apart from said locking angular position, said locking swing plate in said locking angular position having a major blocking surface extending toward said door in a blocking attitude, said blocking attitude determined for said major blocking surface to engage the door interior surface when the door occupies closed position, said locking swing plate in said locking angular position being received in a locking channel of said mounting plate to limit pivoting movement of said locking angular position, said locking swing plate configured for translation movement along said hinge pin vertical axis between an uppermost vertical position and lowermost vertical position.

2. The door locking device of claim 1, said device further comprising:

said locking swing plate positively biased by force of gravity for vertical translation movement to a lowermost position from an uppermost position when in said locking angular position, said locking swing plate positively retained in said lowermost position by the gravity biasing force to remain in fixed position in said locking channel in relation to said mounting plate in said lowermost locked position unless moved by manual intervention.

3. The door locking device of claim 1, said device further comprising:

said locking swing plate when simultaneously in the locking angular position and the lowermost vertical position being releasably fixed in lowermost locked position by cooperation of a locking channel major vertical wall and opposed locking channel minor lower wall of said locking channel located to prevent pivoting movement of said locking swing plate out of said locking angular position by obstructing said locking swing plate from pivoting movement about said hinge pin vertical axis when said locking swing plate is in said lowermost vertical position, in said lowermost locked position said major blocking surface in said blocking attitude located and oriented to abut said door interior surface in substantially perpendicular relationship to said first inner surface of said mounting plate, said locking swing plate positively biased by force of gravity for vertical translation movement to said lowermost position from said uppermost position when in said angular locking position, said locking swing plate positively retained in said lowermost position by the gravity biasing force to remain in fixed position in said locking channel in relation to said mounting plate in said lowermost locked position unless moved by manual intervention.

4. A door locking device of claim 3, said device further comprising:

said hinge pin assembly comprising said hinge pin having a hinge pin head adjoined to an elongated hinge pin shank having a male threaded end opposite said hinge pin head, said hinge pin assembly comprising a hinge pin end cap having female threads configured for mating threaded engagement with said male threaded end.

5. A door locking device of claim 4, said device further comprising:

a plurality of said hinge pin spacers.

6. A door locking device of claim 5, said device further comprising:

said cylindrical body having a spacer outer radius relative to said hinge pin vertical axis, said spacer outer radius substantially equal to said second receiver outer radius to enable movement relative to said first receiver.

7. A door locking device of claim 4, said device further comprising:

said hinge pin spacer comprising said elongated cylindrical body configured to be received in said first receiver aperture for movement relative to said first receiver.

8. A door locking device of claim 4, said device further comprising:

a plurality of said hinge pin spacers each having a spacer length relative to said hinge pin vertical axis, said spacer length determined to enable longitudinal translation movement of said second receiver between said uppermost position and said lowermost position.

9. The door locking device of claim 1, said device further comprising:

said mounting plate comprising a mounting plate major body having a planar first rear surface configured to abut the second jamb interior surface, said mounting plate major body having a planar first front surface disposed in opposed parallel relationship to said first rear surface, said mounting plate comprising a spaced plurality of first mounting apertures extending through said mounting plate major body from said first rear surface to said first front surface to receive said plurality of first threaded fasteners extending therethrough, said plurality of first threaded fasteners configured to extend through said first major body into the second jamb to secure said mounting plate to said second jamb with said first rear surface abutting the second jamb interior surface;

said mounting plate comprising a forward edge proximate the second jamb stopping surface, said mounting plate comprising a rear vertical edge spaced apart from said forward edge, said mounting plate comprising a hinge pin vertical axis proximate said rear vertical edge outside a swing path of the door, said mounting plate comprising a set of first receiver ears spaced apart along said hinge pin vertical axis;

said mounting plate comprising a set of first receiver bays spaced apart along said hinge pin vertical axis adjacent said set of first receiver ears in alternating relationship therewith, each of said first receiver bays defined next to an adjacent receiver ear including at least one of an upper receiver ear immediately above and a lower receiver ear immediately below said first receiver bay defined therebetween;

said set of first receiver bays configured to receive in mating relationship a corresponding set of second receiver ears of an adjacent locking swing plate, said set of second receiver ears docking in said set of first receiver bays in registration relationship therewith;

said first receiver ears extending from said mounting plate major body in integral fixed relationship therewith, each of said first receiver ears comprising a proximal portion adjoining said mounting plate major body and a distal portion spaced from said proximal portion thereof, each of said first receiver ears comprising a first receiver wall extension to said distal portion from said proximal portion, said first receiver wall comprising a first receiver wall return from said distal portion to said proximal portion, cooperation of said first receiver wall extension with said first receiver wall return defining therebetween a first receiver aperture having a continuous tubular first receiver wall inner surface spaced from a first receiver aperture vertical axis in equidistant relationship at a first receiver wall inner radius, said first receiver wall comprising a continuous first receiver wall outer surface disposed in spaced opposed relationship to said first receiver wall inner surface;

said first receiver wall in the vertical direction extending from a continuous first receiver top surface to a continuous first receiver bottom surface, said first receiver wall terminating at said continuous first receiver top surface, said first receiver top surface extending from said first receiver wall outer surface to said first receiver wall inner surface in perpendicular intersecting relationship therewith, said first receiver top surface intersecting said first receiver wall outer surface at a continuous first top surface outer edge spaced from said first receiver aperture vertical axis at a first receiver wall outer radius, said first receiver top surface intersecting said first receiver wall inner surface at a continuous first top surface inner edge spaced from said first receiver aperture vertical axis in equidistant relationship at said first receiver wall inner radius.

10. A door locking device of claim 1, said device further comprising:

said first threaded fastener combination comprising an elevator bolt.

11. A door locking device of claim 10, said device further comprising:

a hinge pin spacer comprising an elongated cylindrical body configured to receive said hinge pin shank extending therethrough.

12. A door locking device of claim 1, said device further comprising:

a hinge pin assembly comprising an elongated hinge pin.

13. A door locking device for securing an in-swing door against forced entry, the inswing door mounted to a door hinge supported by a door frame for door swinging movement between a door closed position and a plurality of door open positions, the door having a lock stile opposite the door hinge, the door having a door body including a door interior surface facing the door frame, the door having a door exterior surface facing opposite the door interior surface, at the lock stile the door having a vertically elongated door outside edge extending between the door interior surface and the door exterior surface in intersecting perpendicular relationship therewith, proximate the door hinge the door frame having an elongated first jamb extending in the vertical direction, proximate the door outside edge the door frame having an elongated second jamb extending in the vertical direction, the second jamb having an elongated second jamb interior surface extending in the vertical direction, in the door closed position the second jamb interior surface extending in corresponding parallel opposed relationship to the door outside edge, in the door closed position along the door outside edge the second jamb stopping surface abutting the door exterior surface in corresponding parallel opposed relationship to same, said door locking device comprising:

a mounting plate configured to be secured to the second jamb interior surface by a plurality of first threaded fasteners extending from said mounting plate into the second jamb;

said mounting plate having a first receiver wall extending from the mounting plate major body in spaced relationship to the second jamb, said first receiver wall defining a receiver space to receive a locking swing plate configured for pivoting movement about a hinge pin about a hinge pin vertical axis, said first receiver wall having a first receiver top surface in a radial direction perpendicular to a first receiver aperture vertical axis;

said first receiver wall varying in height, said first receiver wall comprising a first major rest spaced apart from said mounting plate major body, said first major rest having a first major rest height defining maximum height of said first receiver wall;

said first receiver wall comprising a declining slide surface intersecting said first major rest at a first slide surface upper transition, said declining slide surface at a first slide surface lower transition intersecting a first locking channel opposite said first slide surface upper transition, said declining slide surface having varying height and extending downward from said first slide surface upper transition to first slide surface lower transition;

said first receiver wall comprising a locking channel extending from said first receiver wall inner surface to said first receiver wall outer surface to define a locking channel open slot, said locking channel having a locking channel major vertical axis, said locking channel comprising a locking channel major wall intersecting a locking channel top end in spaced vertical relation to a locking channel bottom wall, said locking channel comprising a locking channel lower wall opposite said locking channel major wall, said locking channel lower wall extending from said locking channel bottom wall to said first slide surface lower transition, said locking channel comprising a locking channel upper wall opposite said locking channel major wall, said locking channel upper wall extending from said locking channel top end to a locking channel open mouth located above said first slide surface lower transition;

said first receiver wall comprising said locking channel bottom wall extending at substantially ninety degrees (90°) in relation to said first rear surface of said mounting plate major body, said locking channel bottom wall having a locking channel bottom wall height defining a minimum height of said first receiver wall;

said first receiver wall comprising said declining slide surface lower transition extending at substantially ninety degrees (90°) in relation to said first rear surface of said mounting plate major body, said declining slide surface lower transition having a lower wall transition height defining a transition height of said first receiver wall;

said first receiver wall comprising said declining slide surface changing height from said first major rest height at said first slide surface upper transition to said lower wall transition height at said declining slide surface lower transition;

said declining slide surface at said lower wall transition introducing a neck portion of said second receiver into said locking channel defined therebetween, said neck portion extending through said first receiver wall in said open slot;

said locking swing plate configured for pivoting movement about said hinge pin vertical axis between a locking angular position and unlocked angular position apart from said locking angular position;

said locking swing plate positively biased by force of gravity for vertical translation movement to said lowermost position from said uppermost position when in said angular locking position, said locking swing plate positively retained in said lowermost position by the gravity biasing force to remain in fixed position in said locking channel in relation to said mounting plate in said lowermost locked position unless moved by manual intervention.

14. A door locking device of claim 13, said device further comprising:

said locking swing plate in said locking angular position having a major blocking surface extending toward said door in a blocking attitude, said blocking attitude determined for said major blocking surface to engage the door interior surface when the door occupies closed position, said locking swing plate in said locking angular position being received in a locking channel of said mounting plate to limit pivoting movement of said locking angular position, said locking swing plate configured for translation movement along said hinge pin vertical axis between an uppermost vertical position and lowermost vertical position, said locking swing plate when simultaneously in the locking angular position and the lowermost vertical position being releasably fixed in lowermost locked position by cooperation of a locking channel major vertical wall and opposed locking channel minor lower wall of said locking channel located to prevent pivoting movement of said locking swing plate out of said locking angular position by obstructing said locking swing plate from pivoting movement about said hinge pin vertical axis when said locking swing plate is in said lowermost vertical position, in said lowermost locked position said major blocking surface in said blocking attitude located and oriented to abut said door interior surface in substantially perpendicular relationship to said first inner surface of said mounting plate.

15. A door locking device of claim 13, said device further comprising:

said mounting plate comprising a mounting plate major body having a planar first rear surface configured to abut the second jamb interior surface, said mounting plate comprising a spaced plurality of first mounting apertures extending through said mounting plate major body through said first rear surface to receive said plurality of first threaded fasteners extending therethrough, said plurality of first threaded fasteners configured to extend through said first major body into the second jamb to secure said mounting plate to said second jamb with said first rear surface abutting the second jamb interior surface;

said mounting plate comprising a hinge pin vertical axis proximate a rear vertical edge thereof outside a swing path of the door, said mounting plate comprising a set of first receiver ears spaced apart along said hinge pin vertical axis, said mounting plate comprising a set of first receiver bays spaced apart along said hinge pin vertical axis adjacent said set of first receiver ears in alternating relationship therewith, each of said first receiver bays defined next to an adjacent receiver ear;

said set of first receiver bays configured to receive in mating relationship a corresponding set of second receiver ears of an adjacent locking swing plate, said set of second receiver ears docking in said set of first receiver bays in registration relationship therewith;

said first receiver ears extending from said mounting plate major body in integral fixed relationship therewith, each of said first receiver ears comprising a first receiver wall defining therein a respective first receiver aperture having a central first receiver aperture vertical axis in equidistant relationship and a first receiver aperture radius about said central first receiver aperture vertical axis;

said first receiver wall in the vertical direction extending from a continuous first receiver top surface to a continuous first receiver bottom surface, said first receiver wall terminating at said continuous first receiver top surface, said first receiver top surface extending from said first receiver wall outer surface to said first receiver wall inner surface in perpendicular intersecting relationship therewith, said first receiver top surface intersecting said first receiver wall outer surface at a continuous first top surface outer edge spaced from said first receiver aperture vertical axis at a first receiver wall outer radius, said first receiver top surface intersecting said first receiver wall inner surface at a continuous first top surface inner edge spaced from said first receiver aperture vertical axis in equidistant relationship at said first receiver wall inner radius, said first receiver wall having a width from said first receiver wall inner surface to said first receiver wall outer surface, said first receiver having a first receiver wall inner radius from said first receiver wall inner surface to said central first receiver aperture vertical axis, said first receiver having a first receiver wall outer radius from said first receiver wall outer surface to said central first receiver aperture vertical axis.

16. A door locking device of claim 13, said device further comprising:

said mounting plate comprising a set of first receiver ears spaced along said hinge pin vertical axis;

said locking swing plate comprising a set of second receiver ears spaced along said hinge pin vertical axis;

said mounting plate comprising a set of first receiver bays spaced along said hinge pin vertical axis adjacent each of said first receiver ears to receive corresponding of said second receiver ears;

said locking swing plate comprising a set of second receiver bays spaced along said hinge pin vertical axis adjacent each of said second receiver ears to receive corresponding of said first receiver ears.

17. A door locking device of claim 13, said device further comprising:

each of said first receiver ears comprising a first receiver aperture sized to receive a corresponding second receiver annular wall in said uppermost position of said locking swing plate;

each of said first receiver ears comprising a first receiver top surface outside said first receiver aperture, said first receiver top surface configured to engage a corresponding second receiver bottom surface outside a second receiver annular wall bottom surface;

said first receiver top surface comprising a first receiver rest defining a first receiver uppermost height, said first receiver top surface comprising a first locking channel bottom wall defining a first receiver lowermost height, said first receiver top surface comprising a first declined slide surface defining a first receiver differential height between said first receiver uppermost height and said first receiver lowermost height.

* * * * *